(12) United States Patent
Yuen et al.

(10) Patent No.: US 6,463,206 B1
(45) Date of Patent: Oct. 8, 2002

(54) TELEVISION AND VIDEO CASSETTE RECORDER SYSTEM WITH AN ELECTRONIC PROGRAM GUIDE

(75) Inventors: Henry C. Yuen, Pasadena, CA (US); Daniel S. Kwoh, La Cañada/Flintridge, CA (US)

(73) Assignee: Gemstar Development Corporation, Pasadena, CA (US)

( * ) Notice: Subject to any disclaimer, the term of this patent is extended or adjusted under 35 U.S.C. 154(b) by 0 days.

(21) Appl. No.: 09/612,323

(22) Filed: Jul. 6, 2000

Related U.S. Application Data

(63) Continuation of application No. 09/134,032, filed on Aug. 14, 1998, now abandoned, which is a continuation of application No. 08/760,438, filed on Dec. 4, 1996, now abandoned, which is a continuation of application No. 08/692,486, filed on Aug. 6, 1996, now abandoned, which is a continuation-in-part of application No. 08/688,599, filed on Jul. 30, 1996, now abandoned, which is a continuation of application No. 08/226,656, filed on Apr. 12, 1994, now Pat. No. 5,541,738, which is a continuation of application No. 08/140,211, filed on Oct. 20, 1993, now Pat. No. 5,543,929, which is a continuation-in-part of application No. 08/138,632, filed on Oct. 15, 1993, now abandoned, which is a continuation-in-part of application No. 08/118,001, filed on Sep. 8, 1993, now Pat. No. 5,382,983, which is a continuation of application No. 08/100,616, filed on Jul. 29, 1993, now abandoned.

(51) Int. Cl.[7] ................................................. H04N 5/91
(52) U.S. Cl. ......................................... 386/69; 386/83
(58) Field of Search .............................. 386/83, 46, 69, 386/68, 80, 81, 92, 1, 6; 360/32; 348/461, 465, 468

(56) References Cited

U.S. PATENT DOCUMENTS 5,390,027 A * 2/1995 Henmi et al. .................. 386/83
5,541,738 A * 7/1996 Mankovitz .................... 386/83
5,543,929 A * 8/1996 Mankovitz .................... 386/83

* cited by examiner

Primary Examiner—Robert Chevalier
(74) Attorney, Agent, or Firm—Christie, Parker & Haler, LLP

(57) ABSTRACT

A television for controlling a video cassette recorder to access programs on a video cassette tape, the television retrieving a directory of programs from a television signal received from the video cassette recorder, retrieving a program identifier from the television signal received from the video cassette recorder, displaying the directory of programs to allow a user to select a program from the directory, determining from the retrieved program identifier and the selected program the amount to either advance or rewind the video cassette tape to position the video cassette tape in the video cassette recorder at the beginning of the selected program, and commanding the video cassette recorder to position the video cassette tape at the beginning of the selected program. An indexing VCR system which responds to broadcast information to record a program guide which may subsequently be displayed to apprise the user of programs to be broadcast during the next day or week, etc. The program guide enables the user to condition the VCR to record selected programs when they are broadcast. The program guide may also include film clips of selected programs to assist the user in making a decision as to whether he/she desires to record any particular program. The program guide is preferably recorded on the video tape in the VCR in the form of a multi-cell grid and as full frame video so that information concerning each program may be displayed in respective cells in the grid. Other information, such as the PLUSCODE™, address of the corresponding clip, etc., may be transmitted to the user during the VBI intervals.

9 Claims, 33 Drawing Sheets

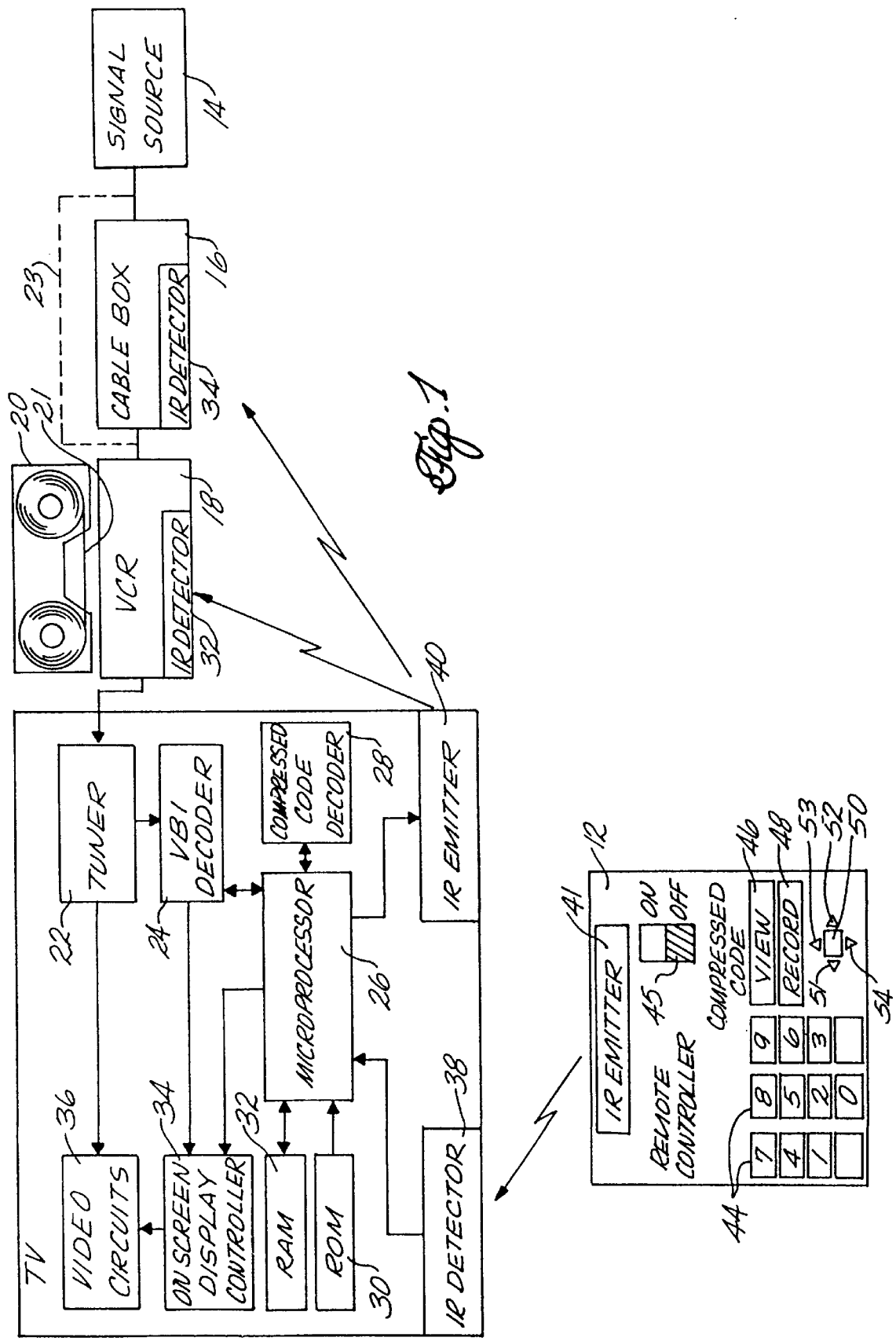

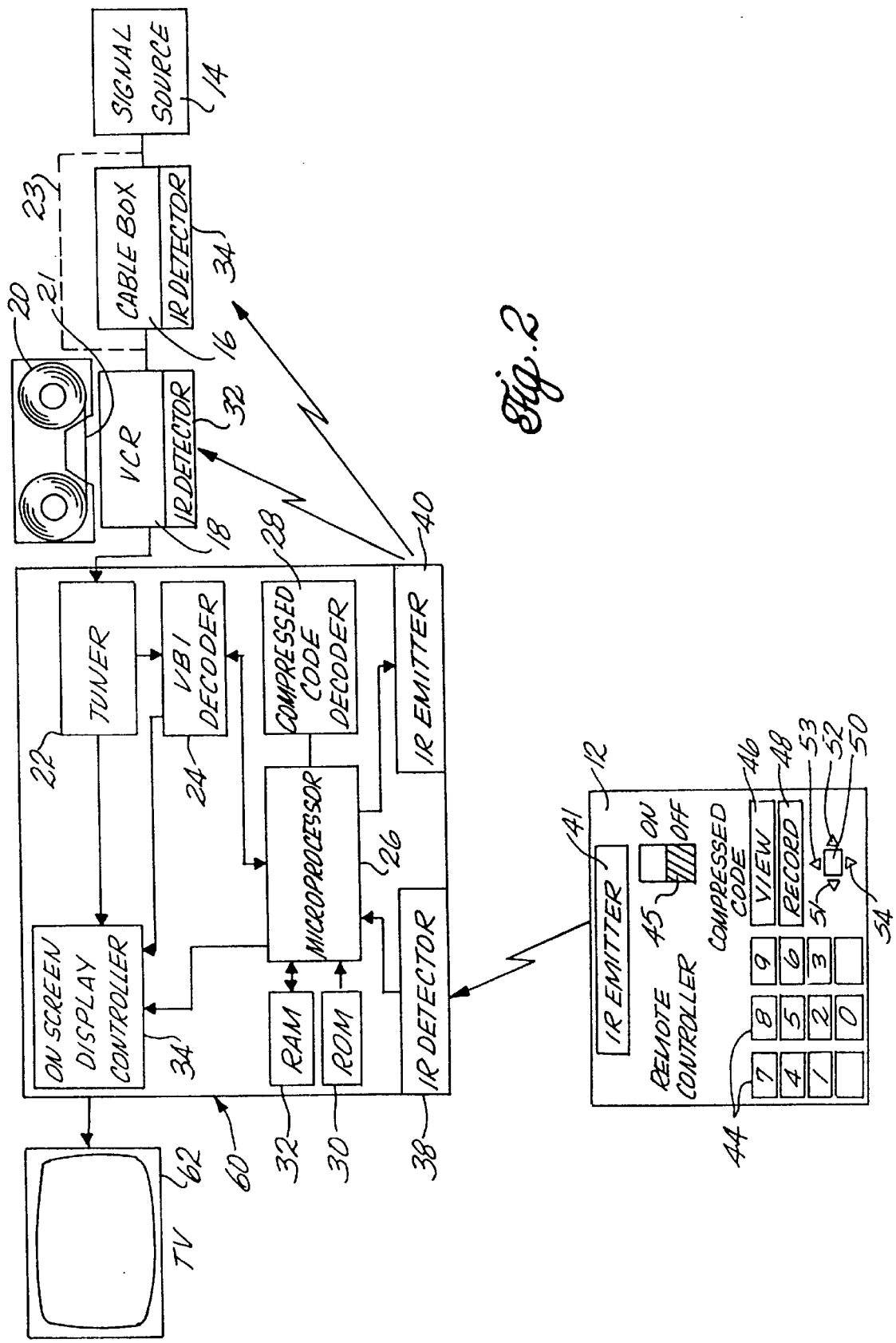

Fig. 6B

LIBRARY FORMAT 166

TAPE NO. 1
  TARZAN
  TERMINATOR

TAPE NO. 2
  <u>CAR GUIDE</u>
  MERCEDES VIDEO CLIP
  LEXUS VIDEO CLIP

<u>SPORTS GUIDE</u>
  NFL MONDAY NITE FOOTBALL CLIP
  NHL PREVIEWS

TAPE NO. 3
  <u>RESTAURANT GUIDE</u>
  ALICES RESTAURANT
  MADEO'S
  22ND ST. LANDING
  ⋮

TAPE NO. 4
  ⋮

Fig. 6C

D(N) FORMAT ON VBI LINE 20 — 170

| ADDITIONAL FIELDS | PROGRAM NUMBER(N) | START ADDRESS | END ADDRESS | RECORD SPEED | COMPRESSED CODE | CHANNEL, DATE TIME-OF-DAY, LENGTH | PROGRAM IDENTIFIER | TITLE |
|---|---|---|---|---|---|---|---|---|
| | 172 | 174 | 176 | 178 | 180 | 182 | 184 | 186 |

Fig. 7

TPA PACKET FORMAT ON VBI LINE 19

| TAPE IDENTIFICATION (TID) | PROGRAM NUMBER (N) | ABSOLUTE ADDRESS (AA) |
|---|---|---|
| 188 | 190 | 192 |

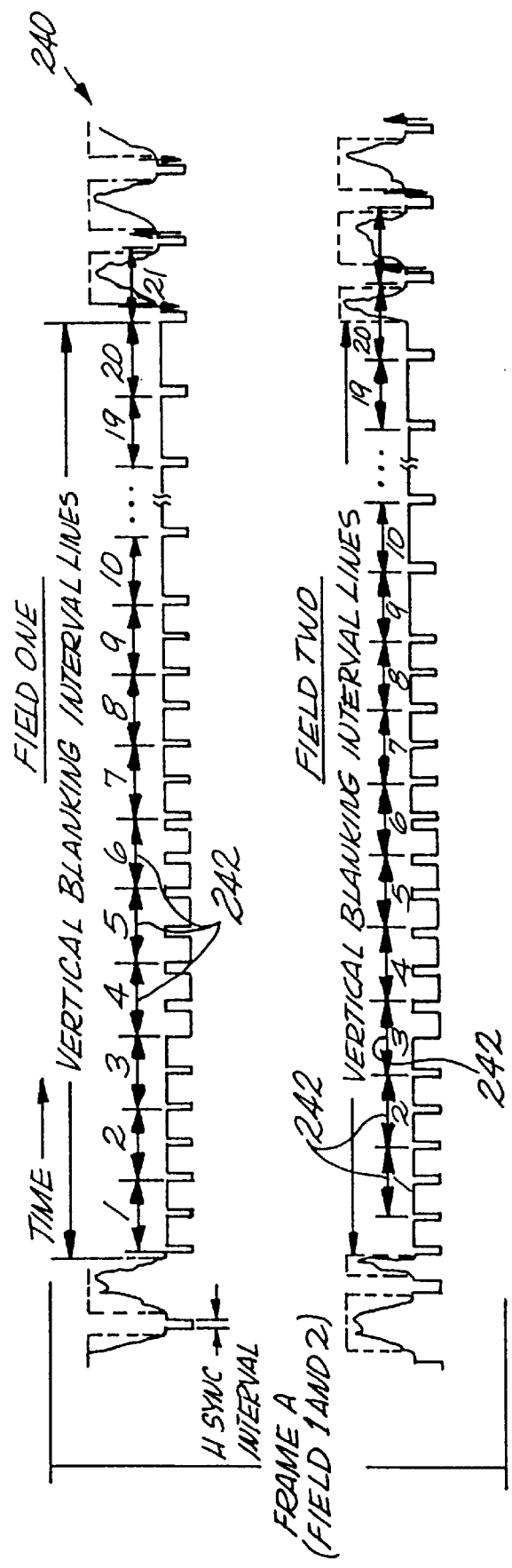

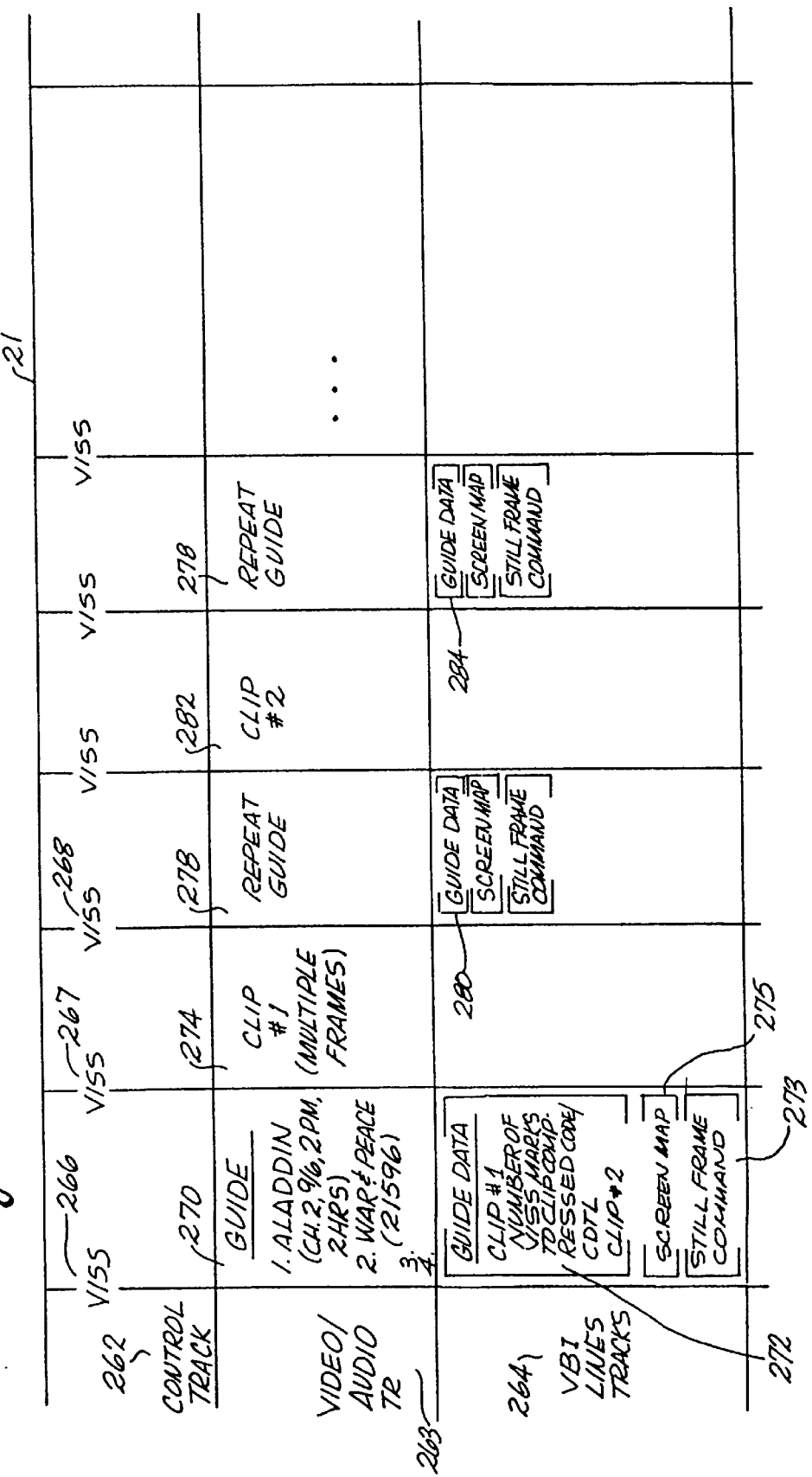

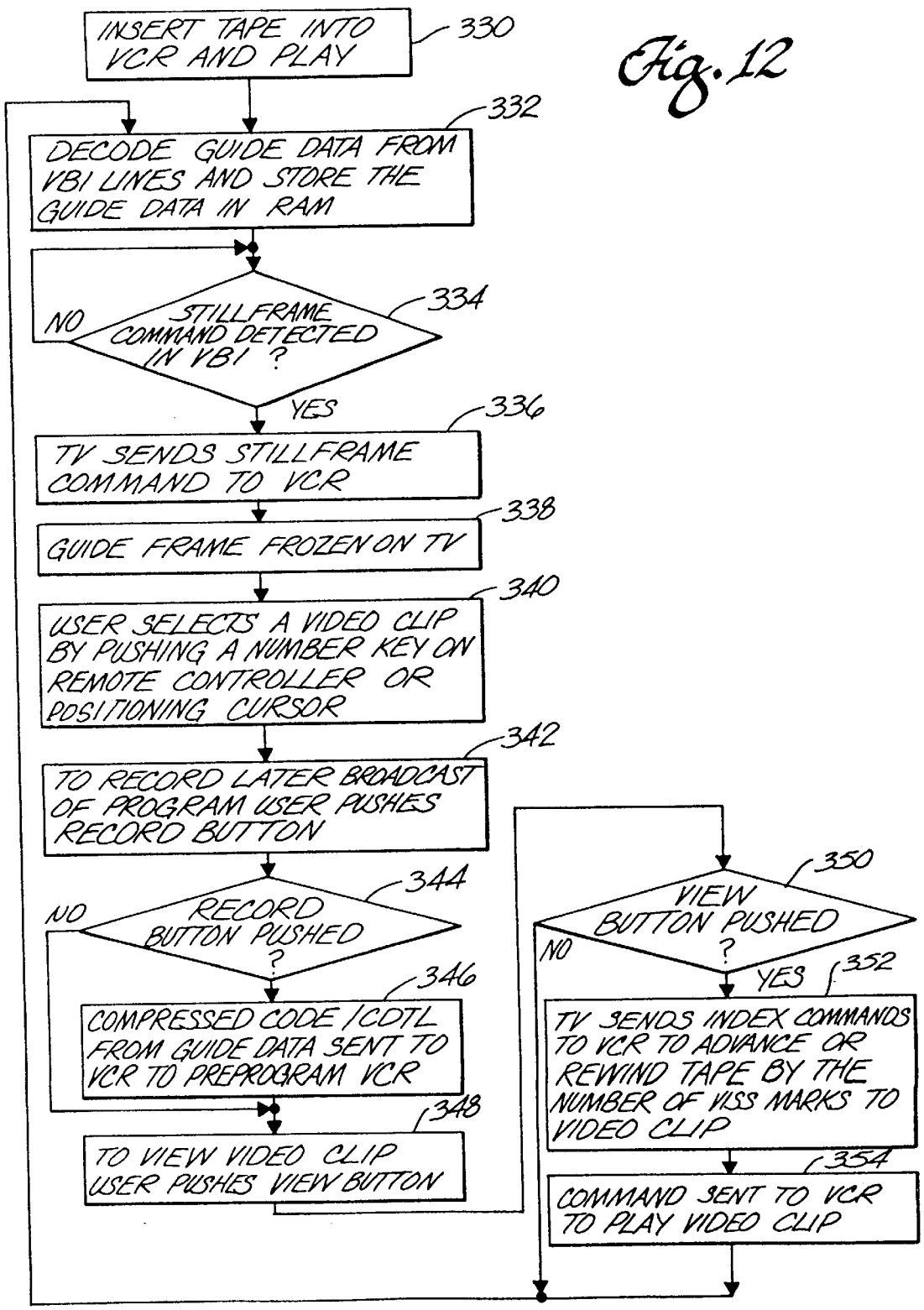

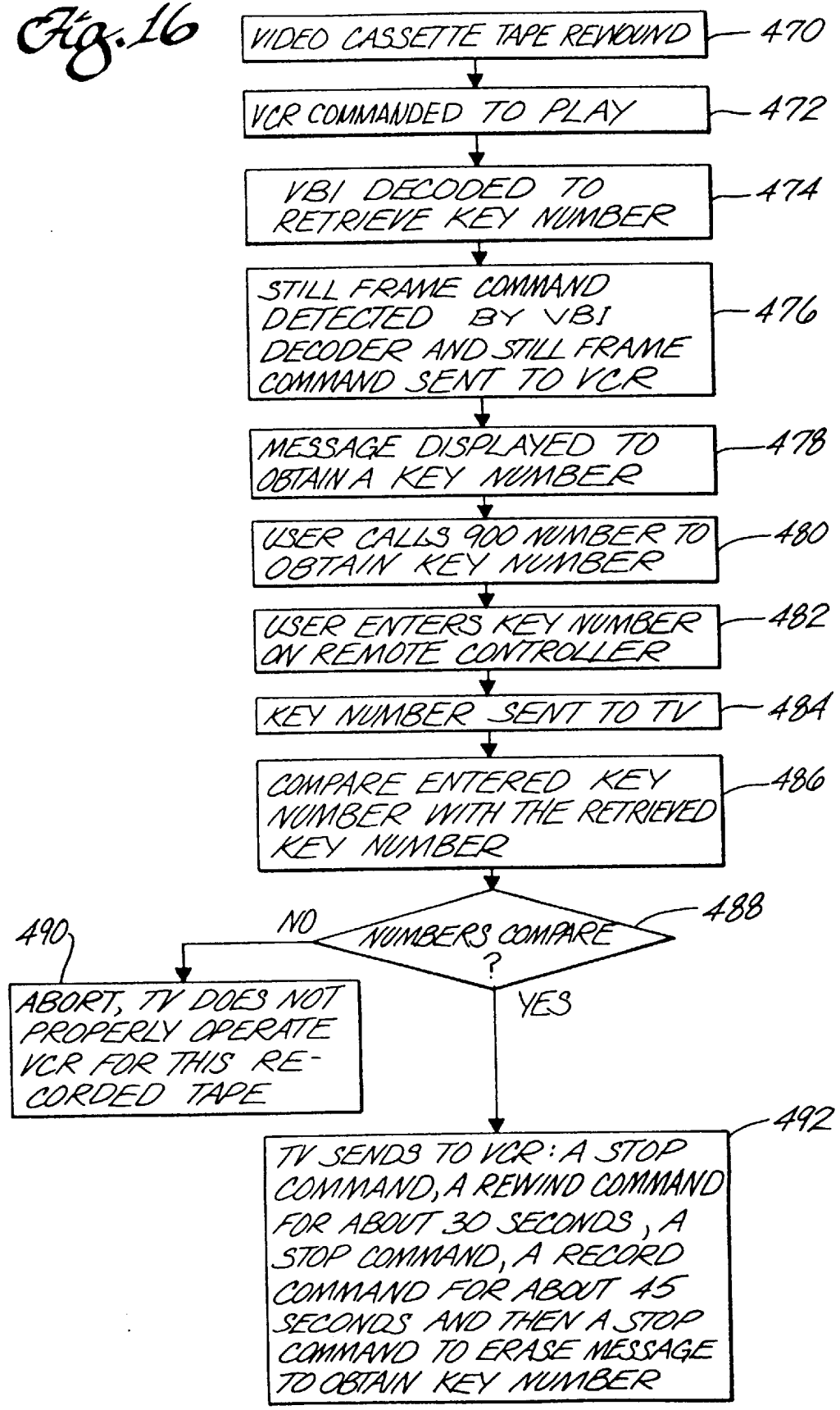

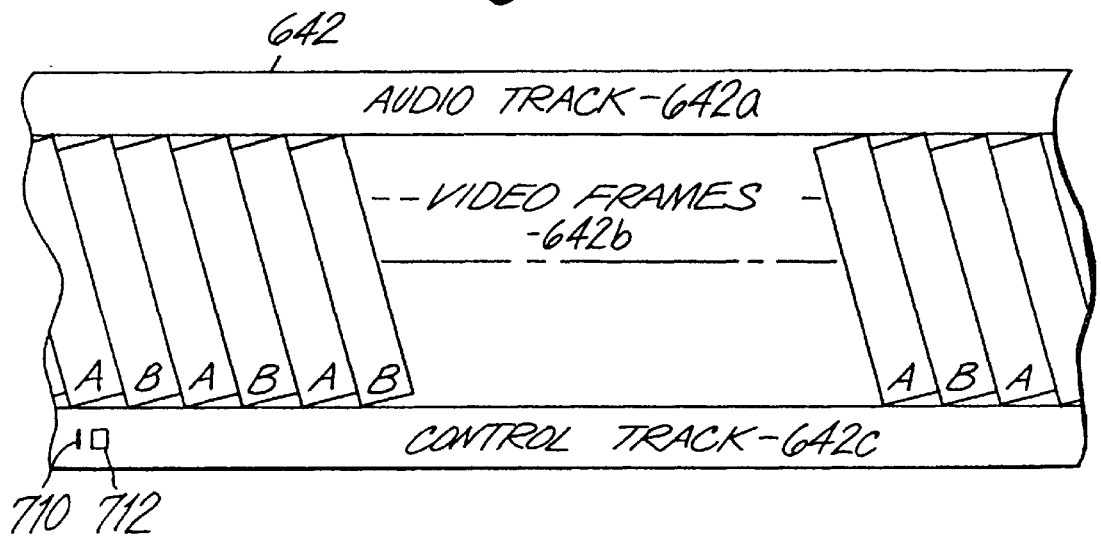
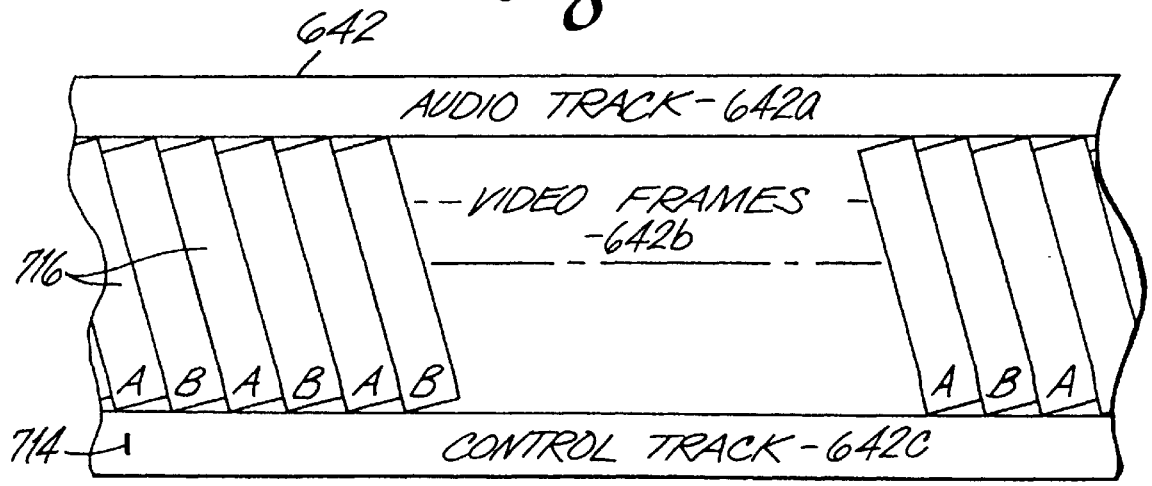

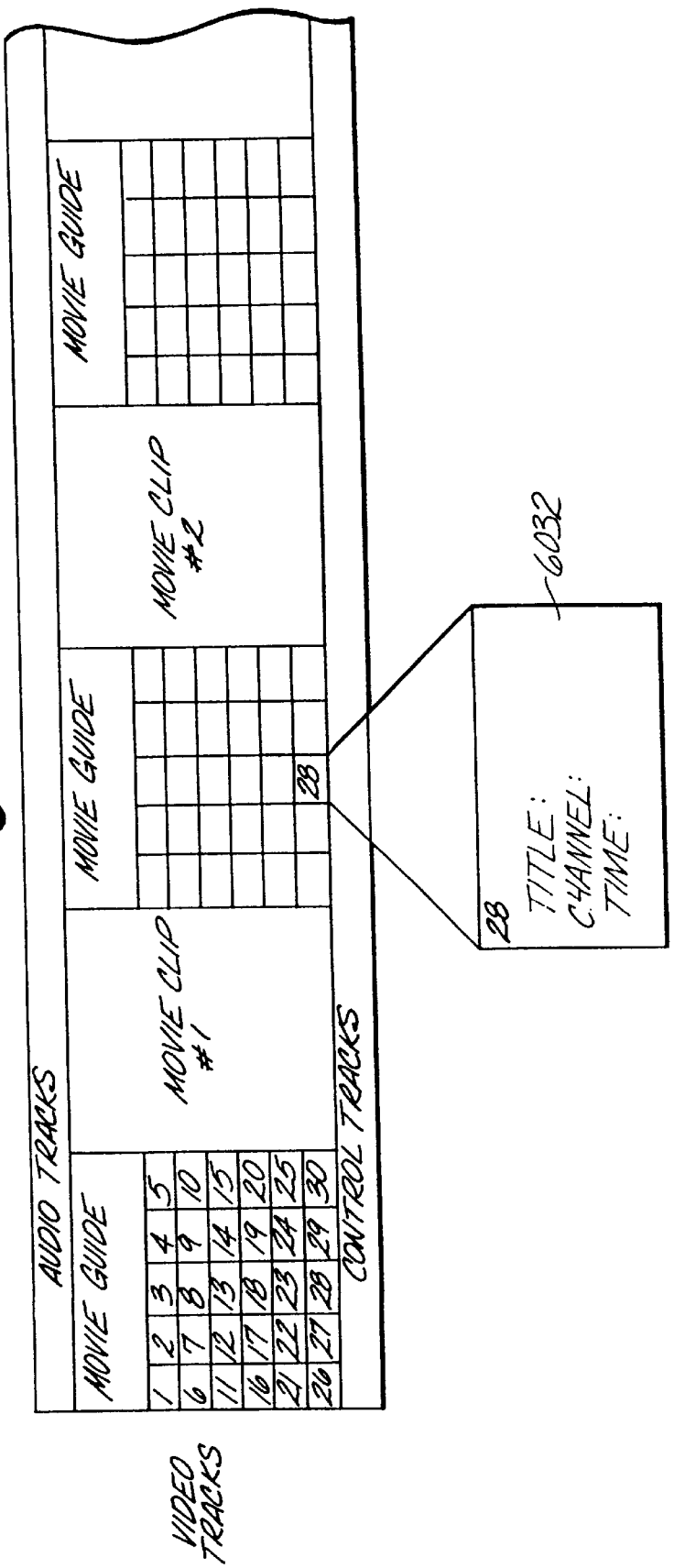

TELEVISION AND VIDEO CASSETTE RECORDER SYSTEM WITH AN ELECTRONIC PROGRAM GUIDE

CROSS-REFERENCE TO RELATED APPLICATIONS

This is a continuation of application Ser. No. 09/134,032 filed Aug. 14, 1998 now abandoned, which is a continuation of application Ser. No. 08/760,438 filed Dec. 4, 1996 abandoned, which is a continuation-in-part of application Ser. No. 08/668,599 filed Jul. 30, 1996 abandoned, which is a continuation of application Ser. No. 08/226,656 filed Apr. 12, 1994 (now U.S. Pat. No. 5,541,738) and application Ser. No. 08/692,486 filed Aug. 6, 1996 abandoned, which is a continuation of application Ser. No. 08/140,211 filed Oct. 20, 1993 (now U.S. Pat. No. 5,543,929), which is a continuation-in-part of application Ser. No. 08/138,632 filed Oct. 15, 1993 abandoned, which is a continuation-in-part of application Ser. No. 08/118,001 filed Sep. 8, 1993 (now U.S. Pat. No. 5,382,983), which is a continuation of application Ser. No. 08/100,616, filed Mar. 29, 1993 abandoned, all of which are incorporated herein by reference as though set forth in full.

BACKGROUND OF THE INVENTION

This invention relates generally to televisions and particularly to apparatus and methods for controlling video cassette recorders from a television and also relates to electronic guides and electronic magazines.

Previews of upcoming movies or television programs are commonly shown to generate interest in them. One technique is to show clips of the video before or after the full presentation of another program. This is done both for television programs or movies to be shown on television. Increasingly common is the inclusion of video clips of other movies on a rented video cassette tape. The renter of the video cassette tape rents the tape to watch a particular movie, but also can watch the previews, which are put onto the otherwise unused tape in the video cassette. A problem with this conventional technique is that the viewer must watch the entire tape to ascertain which previews are present.

Also increasingly common is the video cassette tape with infomercials. Usually, only one infomercial is put on a tape, for example a Plymouth Voyager advertisement, and the tape is mailed out to potential buyers. If more infomercials or advertisements are on the tape then the user must watch the entire tape to see all the advertisements. Even if a table of contents is provided at the beginning of the tape, there is no easy method of advancing the tape to the location of the selected advertisement.

It is desirable to have a common point of control for accessing programs on a video tape cassette and a television is able to provide this capability.

Accordingly, there is a need in the art for a television for controlling a video cassette recorder to access programs on a video cassette tape. There is also a need for a television for providing control for indexing a tape to a selected program or video.

The programming of a VCR for unattended recording was greatly simplified by the introduction of compressed codes for the channel, date, time, and length (CDTL) data for a desired program. The compressed code of Gemstar Development Corporation is known as PLUSCODE™ compressed code.

The further aid in the programming for unattended recording, the program guide or schedule of programs to be broadcast over the air or by cable at a later date are available in the VBI, as full frame video, on tape, on floppy discs or in ROM. The program guide is displayed to provide the user with easy access to the guide and as an aid in programming the VCR for later recording.

SUMMARY OF THE INVENTION

In an embodiment of the present invention a television for controlling a video cassette recorder to access programs on a video cassette tape, includes means for retrieving a directory of programs from a television signal received from the video cassette recorder, means for retrieving a program identifier from the television signal received from the video cassette recorder, means for displaying the directory of programs to allow a user to select a program from the directory, means for determining from the retrieved program identifier and the selected program the amount to either advance or rewind the video cassette tape to position the video cassette tape in the video cassette recorder at the beginning of the selected program, and means for commanding the video cassette recorder to position the video cassette tape at the beginning of the selected program.

The electronic program guide of the present invention provides a video magazine format with respect to video program listings, and it also provides video program clips, to enable a user to select a video program for future viewing or recording. Advantageously, the electronic program guide of the present invention is employed in conjunction with an indexing video cassette recorder/player. The indexing video cassette recorder/player may be of the same general type described in co-pending applications Ser. No. 08/066,666 filed May 27, 1993 and Ser. No. 08/176,852 filed Dec. 29, 1993, which are incorporated herein by this reference.

In the practice of the invention, during regular broadcast hours, a particular channel such as HBO, NBC, CBS, CNN, etc., broadcasts an electronic program guide listing future programs. The program guide is preferably in the format of a video magazine, in which the video portion is divided into video sections or chapters with each chapter representing the program listings for one of a plurality of categories of programs, such as movies, sports or comedy, for example. The program listings form a menu and are arranged in a grid made up of numbered cells. The video section includes a plurality of such menus separated by a video clip relating to one of the listed programs.

During the broadcast, program-related information (PRI) is transmitted, for example, in the vertical blanking interval (VBI), or by other means, relating to the positions of each numbered cell, the start and stop addresses of video clips and also the PLUSCODE™ number for the particular program.

The program guide may be recorded on tape or in RAM of the VCR. For unattended recording, the program guide may have a listed PLUSCODE™ for entry by a user and decoding by the VCR to record when the program guide is transmitted (either over the air or by cable). The electronic program guide, when broadcast, is recorded in the VCR at the time of the broadcast, to be selected at a subsequent time by the user and displayed. Alternatively, the program guide may be available to the user as a prerecorded guide on tape purchased on a subscription basis or from a retail outlet.

The program guide may include PLUSCODE™ numbers for ease of programming for future recording of desired programs or a cursor may be employed upon display of a selected program guide or a number may be entered that corresponds to the cell number of the desired program displayed in a numbered cell of the grid.

BRIEF DESCRIPTION OF THE DRAWINGS

The features of specific embodiments of the best mode contemplated of carrying out the invention are illustrated in the drawings, in which:

FIG. 1 is a schematic showing a television for controlling a video cassette recorder (VCR) to provide access to programs and video clips according to the present invention.

FIG. 2 is a schematic showing a controller between a television and a VCR for controlling a video cassette recorder (VCR) to provide access to programs and video clips according to the present invention.

FIG. 6B is a drawing showing the format of a library of multiple directories according to the present invention.

FIG. 6C is a drawing of the format of a portion of the directory for one program or video clip on a vertical blanking interval (VBI) line 20 according to the present invention.

FIG. 7 is a drawing of the format of a TPA packet containing tape identification, program number, and absolute address information on VBI line according to the present invention.

FIG. 10 is a drawing showing VBI lines according to the present invention.

FIG. 11A is a drawing showing another tape layout for providing access to programs and video clips according to the present invention.

FIG. 12 is a flow graph of the steps for accessing video clips on a magnetic tape having a hierarchy of guides and embedded guide data according to the present invention.

FIG. 16 is a flow graph of the steps for creating a tape during recording of a broadcast of programs, video clips, and/or a video directory according to the present invention.

FIG. 21 is a graphical representation of the format of the information recorded on the magnetic tape in the cassette of FIG. 18 with markers and directories in the control track;

FIG. 22 is a graphical representation of the format of the information recorded on the magnetic tape in the cassette of FIG. 18 with markers in the control track and the directories in the fields of the video frames;

FIG. 28 is a schematic diagram of an alternative electronic program guide received and recorded on the VCR in accordance with the invention where selection is by number of the numbered cells.

DETAILED DESCRIPTION OF THE SPECIFIC EMBODIMENTS

Figure 3A:
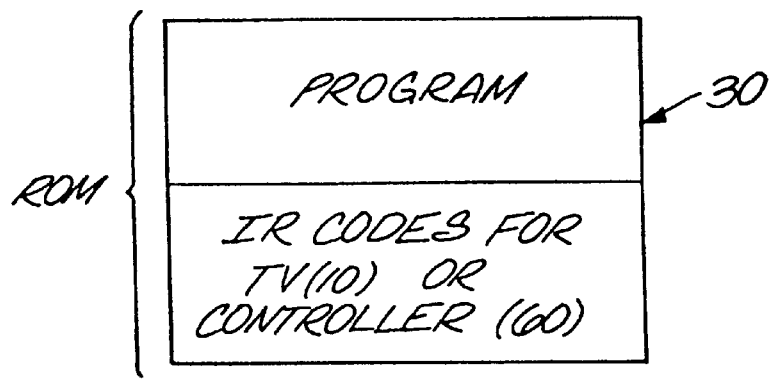
FIGS. 3A and 3B are schematics showing the partial contents of a random-access memory (RAM) and read-only memory (ROM) according to the present invention.

Referring to the drawings, FIG. 1 shows a television 10 for controlling a video cassette recorder 18 to access programs on a video tape cassette 20, which contains tape 21. The video cassette recorder 18 can be used to play video tape cassettes 20, and can also be used to record programs from signal source 14 sent directly via line 23 to VCR 18 or through cable box 16. As shown in FIG. 1, the VCR 18 has an output to tuner 22, which is coupled to video circuits 36. Also receiving the output of tuner 22 is a vertical blanking interval line decoder 24. Vertical blanking interval lines are described below in connection with the discussion of FIG. 10, and information can be contained in the vertical blanking interval lines and decoded. A microprocessor 26 receives decoded VBI information from VBI decoder 24 and processes this information to control VCR 18 to access programs from the video tape cassette 20. Random-access memory 32 and read-only memory are coupled to the microprocessor. An on-screen display controller 34 has an interface to the microprocessor 26 and also an interface to the VBI decoder 24. An infrared detector 38 has an interface to the microprocessor 26 and receives commands from remote controller 12. An infrared emitter 40 in the television 10 interfaces to microprocessor 26 and can send commands to the VCR 18 via infrared detector 32 and to the cable box 16 via the infrared detector 34. A compressed code decoder 28 in the television 10 has an interface to microprocessor 26.

In general the television 10 for controlling the video cassette recorder to access programs on the video cassette tape 20 operates by decoding information in the vertical blanking interval line. In VBI decoder 24, processing that information in microprocessor 26, and commanding the VCR 18 via infrared emitter 40 and infrared detector 32 in order to access selected programs for viewing. The television 10 is also able to interact with the video cassette recorder while it is recording a program from signal source 14. The television 10 can also control the recording of programs to be broadcast at a later time on the VCR 18.

The remote controller 12, shown in FIG. 1 has a number of keys, which include numerical keys 44 and compressed code switch 45. The remote controller 12 also includes a view key 46 and a record key 48. The remote controller may further advantageously include a cursor control having up/down keys 53 and 54, respectively, right/left keys 51 and 52, respectively, and an activate key 50. There are means in the remote controller 12 that interpret each key as it is pressed, and send the proper command signal 16 to the television 10 via the infrared emitter 41. Except for the unique keys including view key 46, record key 48, and compressed code switch 45, the remote controller is essentially the same as any other remote controller in function. It is to be noted that the typical keys of remote controllers, such as volume control and channel selection, are not shown on the controller of FIG. 1, but would ordinarily be present.

In FIG. 2 is shown another embodiment of the invention in which there is a separate controller 60 for controlling the VCR 18 to access programs on video tape cassette 20. A conventional television 62 can be used with controller 60 which is placed between television 62 and the video cassette recorder 18. The controller 60 has a tuner 22 coupled to a VBI decoder 24 and a microprocessor 26 which has interfaces to random-access memory 32 and read-only memory 30. The tuner 22 interfaces to on-screen display controller 34 which also interfaces to VBI decoder 24 and microprocessor 26. The controller operates similarly to the circuitry described for television 10 in that the infrared detector 38 receives commands from remote controller 12 and the commands are processed by microprocessor 26. The controller 60 also can control the operation of VCR 18 and cable box 16 via infrared emitter 40. The operation of remote controller 12 in FIG. 2 is essentially the same as the remote controller 12 in FIG. 1.

Figure 4A:
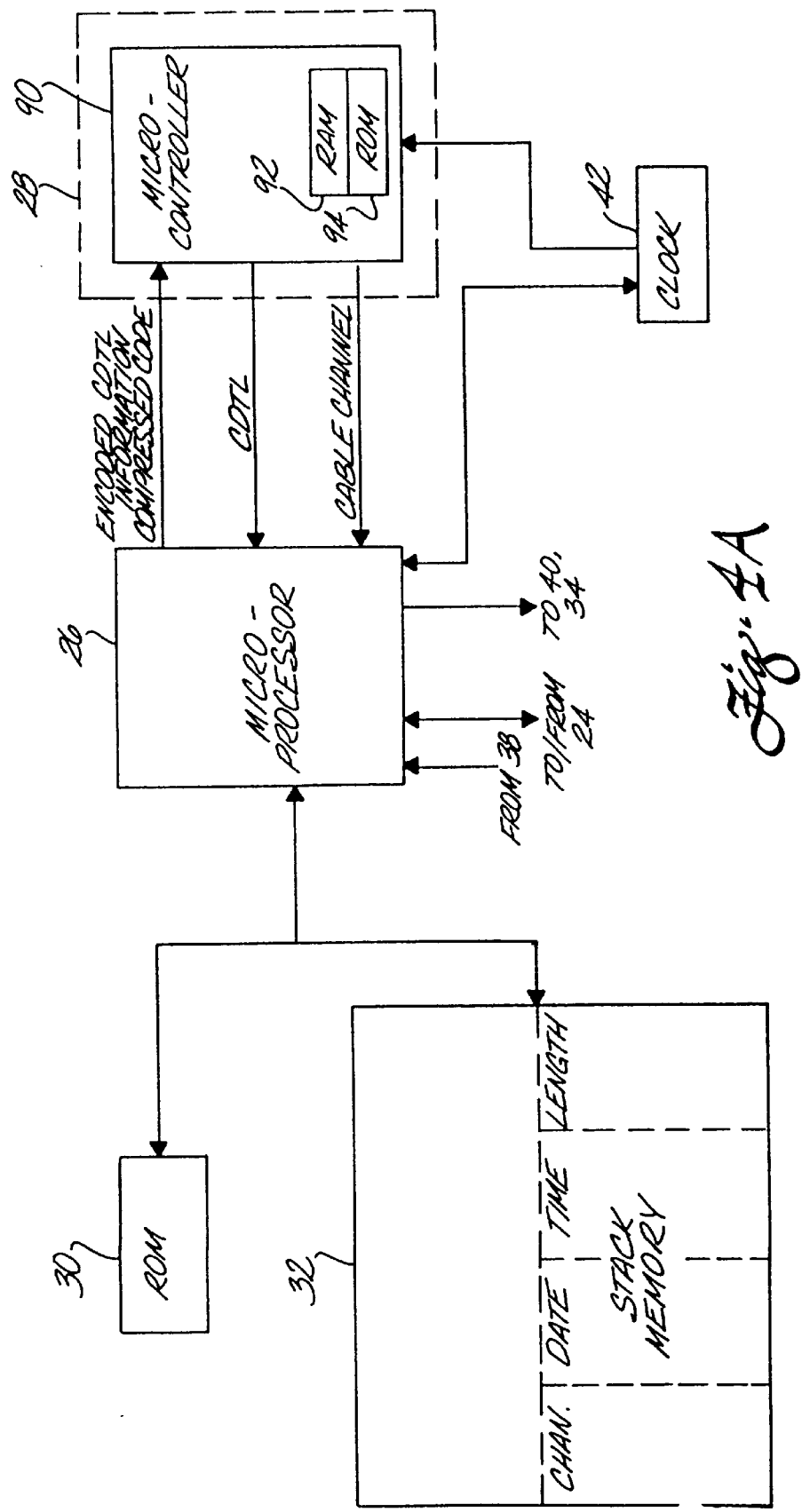
FIG. 4A is a schematic of a compressed code decoder coupled to a microprocessor according to the present invention.

The microprocessor 26, shown in FIGS. 1, 2 and 4A performs the overall control functions, and has attached a read-only memory 30 and a random-access memory (RAM) 32. Interfaces to the microprocessor 26 include an input from infrared detector 38 and outputs to infrared emitter 40 and on screen display controller 34. The microprocessor also interfaces to and from vertical blanking interval decoder 24, to and from clock 42, and to and from compressed code decoder 28.

Figure 3B:
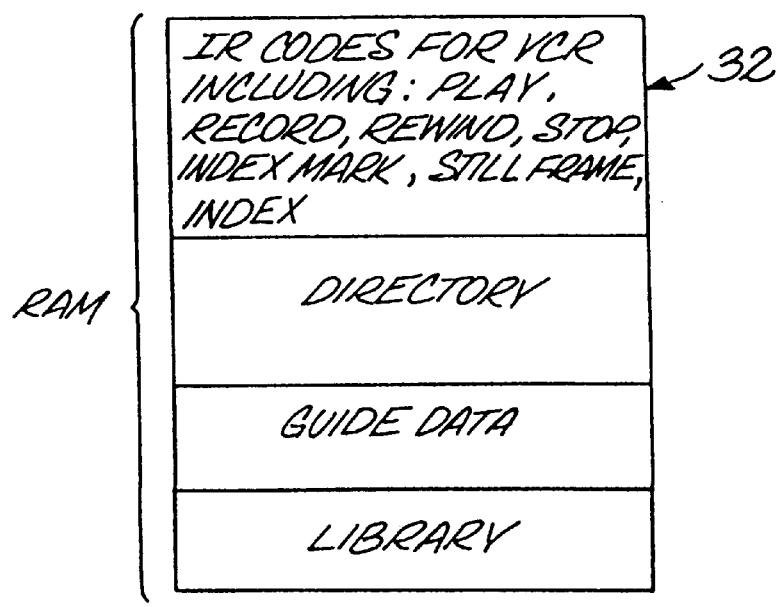

As shown in FIG. 3A, the read-only memory 30 includes a section for a set of instructions for the program that controls the operation of the microprocessor 26 and a section for infrared codes for controlling the television 10 or the controller 60. As shown in FIG. 3B, the random-access memory 32 includes a section for the infrared codes for controlling the VCR including codes for the following commands: play, record, rewind, stop, index mark, still frame, and index to an index mark. Also included are sections for a directory, guide data, and a library, whose functions are described below.

Figure 3C:
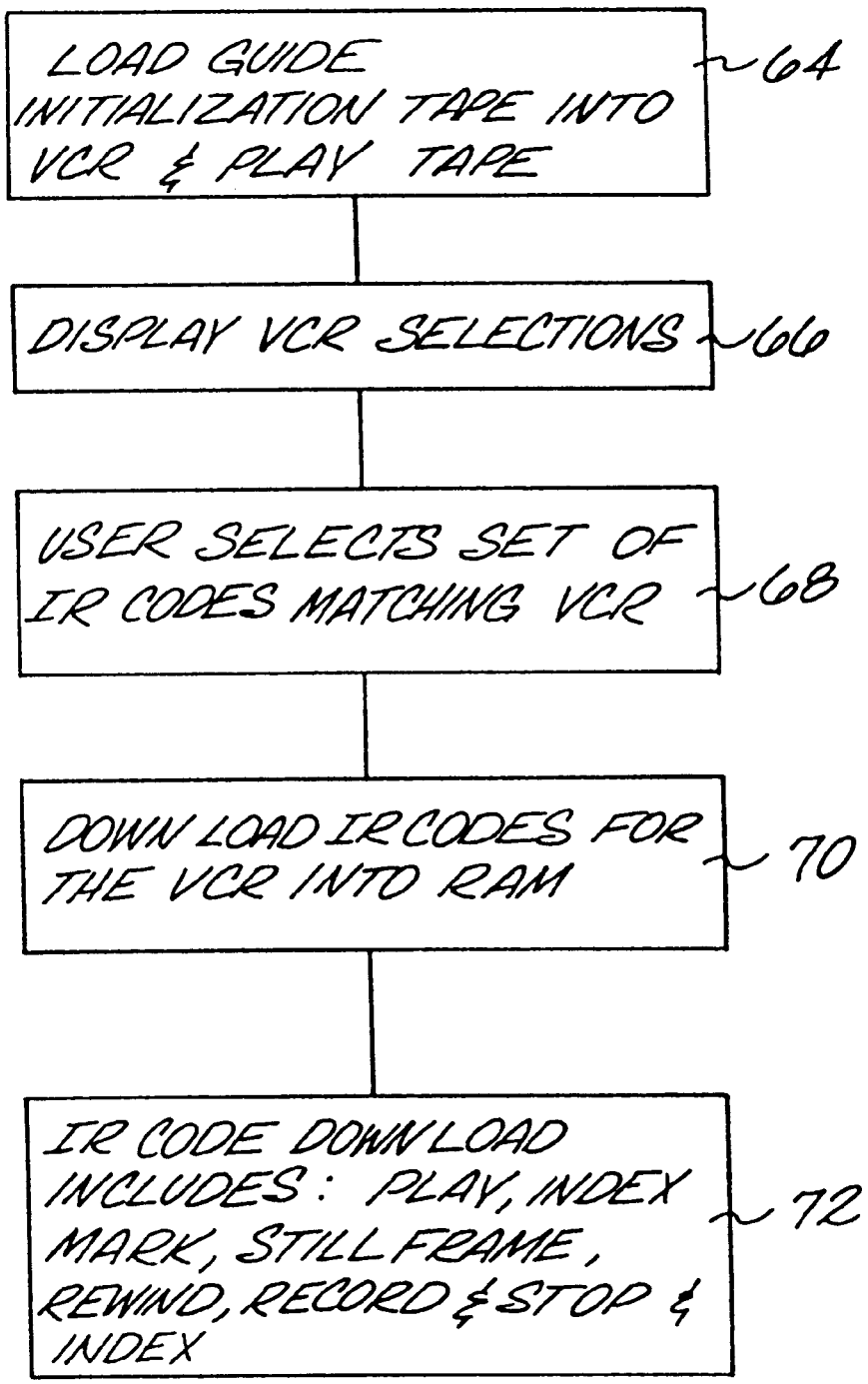
FIG. 3C is a flow graph of steps for loading infrared codes for the VCR into RAM according to the present invention.

FIG. 3C is a flow graph of steps for initializing the television according to the present invention. A special initialization tape is loaded into the video cassette recorder 18 in step 64 and the initialization tape is played. The initialization tape has encoded in its video blanking interval lines the infrared code libraries for substantially all types of VCRs. When the tape is played, video cues are displayed on the television 10 to enable the user to locate the codes for the particular type of VCR in use. Then in step 70 the infrared codes for the user's VCR are downloaded into random-access memory 32 via tuner 22, VBI decoder 24, and microprocessor 26. Once the infrared codes have been loaded into the random-access memory 32 of the television 10 can control the VCR to provide access to programs and video clips.

When a compressed codes are used, the random-access memory 32, as shown in FIG. 4A, includes a section of stack memory for storing channel, date, time-of-day, and length (CDTL) for programs selected to be recorded. The compressed codes are encoded CDTL information and may be advantageously used to simplify the preprogramming of VCRs.

One implementation of the compressed code decoder 28 is shown in FIG. 4A. A microcontroller 90 with a random-access memory 92 and a read-only memory 94 has interfaces to microprocessor 26. A compressed code, which represents encoded CDTL, is sent to microcontroller 90, which decodes the compressed code and returns CDTL information to microprocessor 26. If the microprocessor 26 determines that a compressed code has been received, then the compressed code will be sent to the compressed code decoder 28 for decoding. The compressed code decoder 28 converts the compressed code into channel, date, time and length (CDTL) information which is stored in RAM 32 and used by the microprocessor 26 to control the recording of programs on a VCR.

Figure 4B:
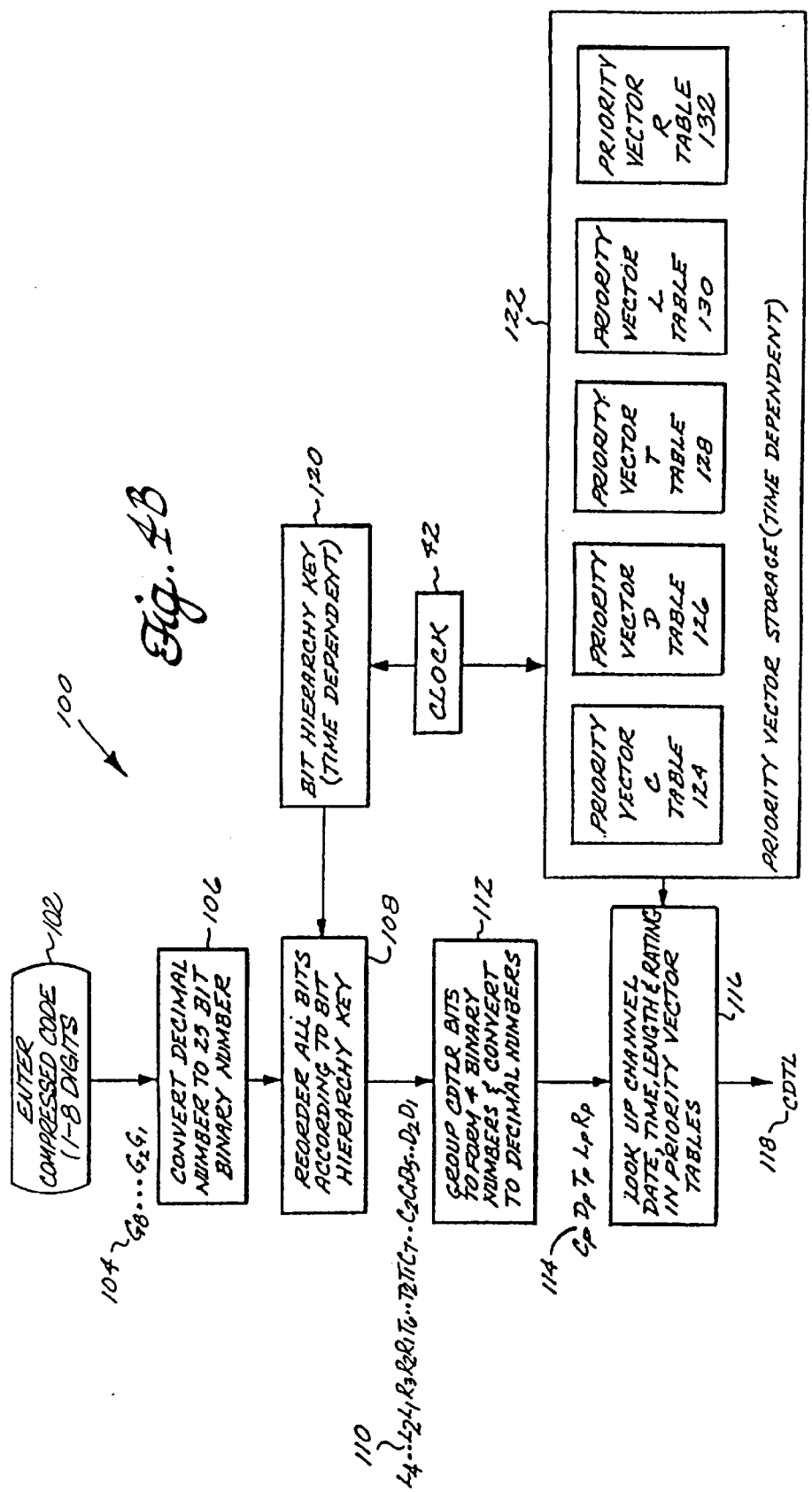
FIG. 4B is a flow graph of the steps for decoding a compressed code, which is encoded channel, date, time-of-day, and length (CDTL) information, into CDTL according to the present invention.

The method of decoding of the compressed code into CDTL is set forth in the flow chart of FIG. 4B. As shown in FIG. 4B, the compressed code decoding can be a function of the output of clock 42. The compressed code encoding and decoding are described in continuation-in-part application Ser. No. 07/829,412, filed Feb. 3, 1992, which is incorporated herein by this reference as though set forth in full.

The clock 42 is also used for timing the operations of the microprocessor 26. When a date and time-of-day is read from clock 42 that matches the date and time in stack memory in random-access memory 32, then the microprocessor 26 controls the VCR to record the program. Instead, if the VCR has preprogramming storage, then the CDTL information can be sent directly to the VCR and a clock in the VCR will be used to control the timing of recording. If the VCR also has the ability to decode the compressed codes, then the compressed codes can be sent directly to the VCR and the VCR will decode the compressed codes into CDTL for the programming the VCR.

Figure 5:
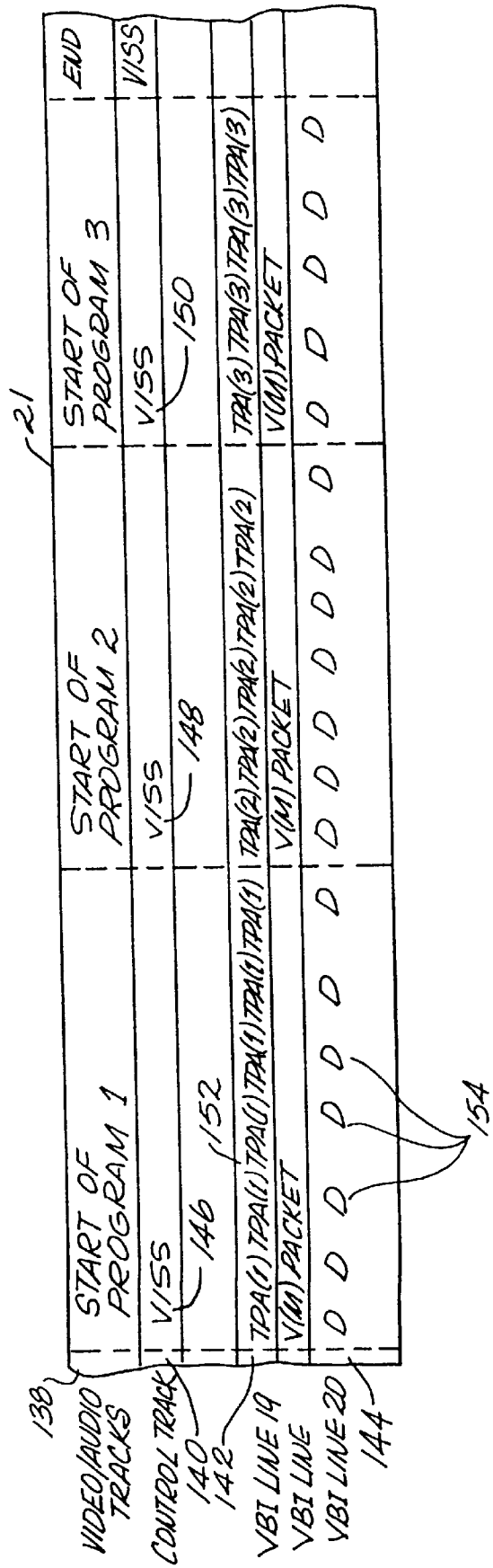
FIG. 5 is a drawing showing a tape layout for providing access to programs and video clips according to the present invention.

FIG. 5 illustrates one layout of information on a tape 21 for playback in VCR 18 under control by television 10 or controller 60. The tape layout has video and audio tracks 138 for the programs, Video Index Search System (VISS) marks on a control track 140, TPA packets each containing a tape identification number, program number, and absolute address stored on a vertical blanking interval line 19, and a directory stored in the vertical blanking interval line 20 in accordance with the principles of the invention.

FIG. 10 is a diagram illustrating a vertical blanking interval of an interlaced television scanning raster. The first field of the television signal starts at the upper left corner of the screen and writes lines to the bottom of the screen. At the bottom of the screen the beam writing the screen retraces in a series of lines back to the top of the screen. These lines are designated as the vertical blanking interval lines 242 in FIG. 10. During the retrace the writing to the screen is blanked; however, because the signal is still present, additional information can be sent during the vertical blanking interval. There are at least 20 lines in the vertical blanking interval. After the vertical blanking interval, the second field is written on the screen and there is another vertical blanking interval, as shown in FIG. 10.

In FIG. 5, VISS marks 146, 148 and 150 are placed in the control track 140 at the start of the each program on the tape.

Figure 9:
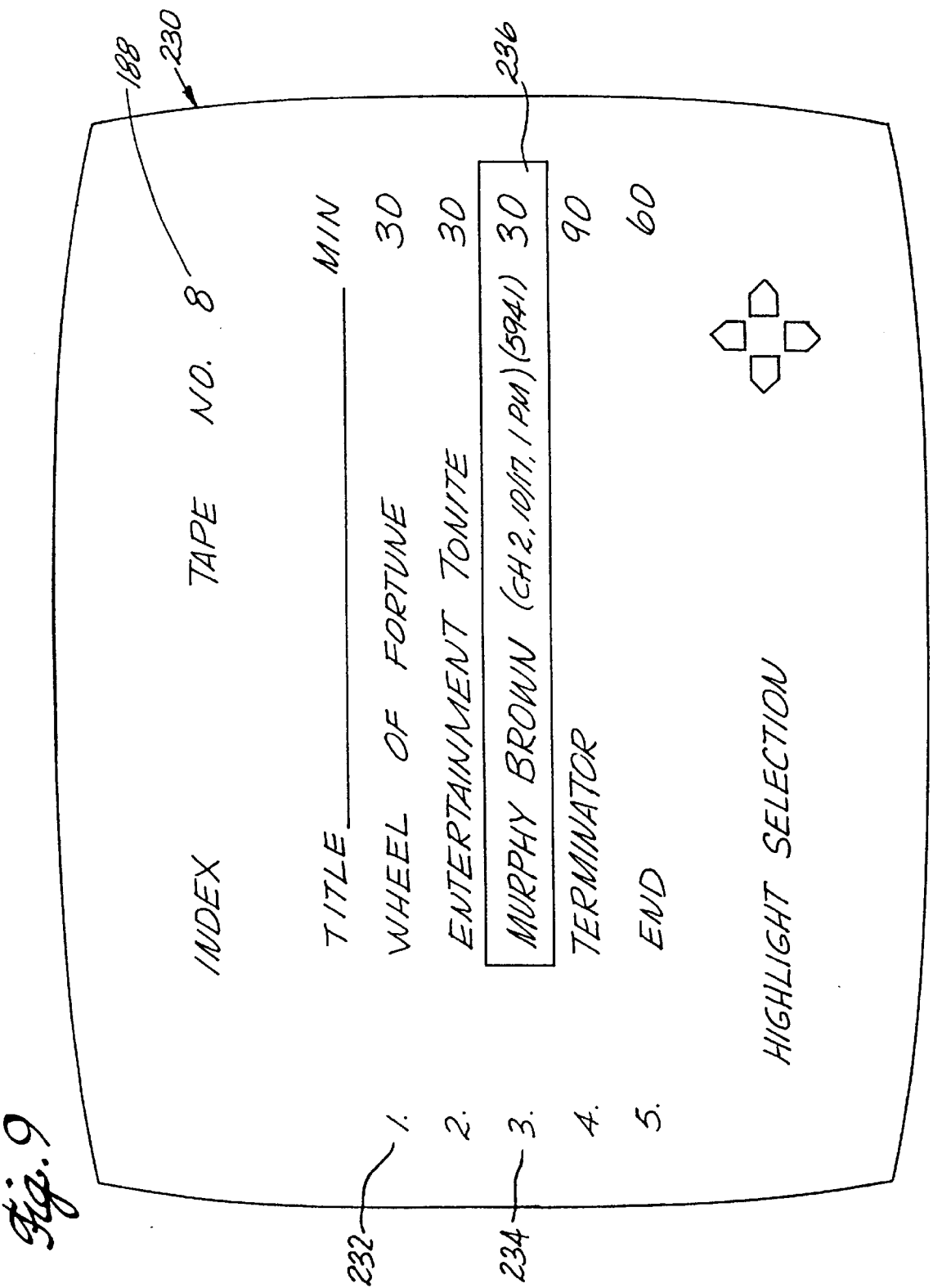
FIG. 9 is a drawing showing a display on a television of a text directory according to the present invention.

The TPA packets 152, shown in FIG. 5, contain a tape identification number 188, a program number 190 and an absolute address 192, as shown in FIG. 7, and are stored in vertical blanking interval line 20, designated as element 144 on FIG. 5. The tape identification is a number that identifies the video cassette tape being used. The program number relates to the number of the program that is recorded on the tape adjacent to the TPA packet. For example, the tape identification number, shown in FIG. 9, is number 8, and the program number for the program MURPHY BROWN is program number 3. The absolute address in the TPA packet is an indication of the time from the beginning of the tape to the location on the tape at which the particular TPA packet is written. Since the TPA is written in VBI lines across the tape, the absolute address varies across the tape and is quite accurate.

Figure 6A:
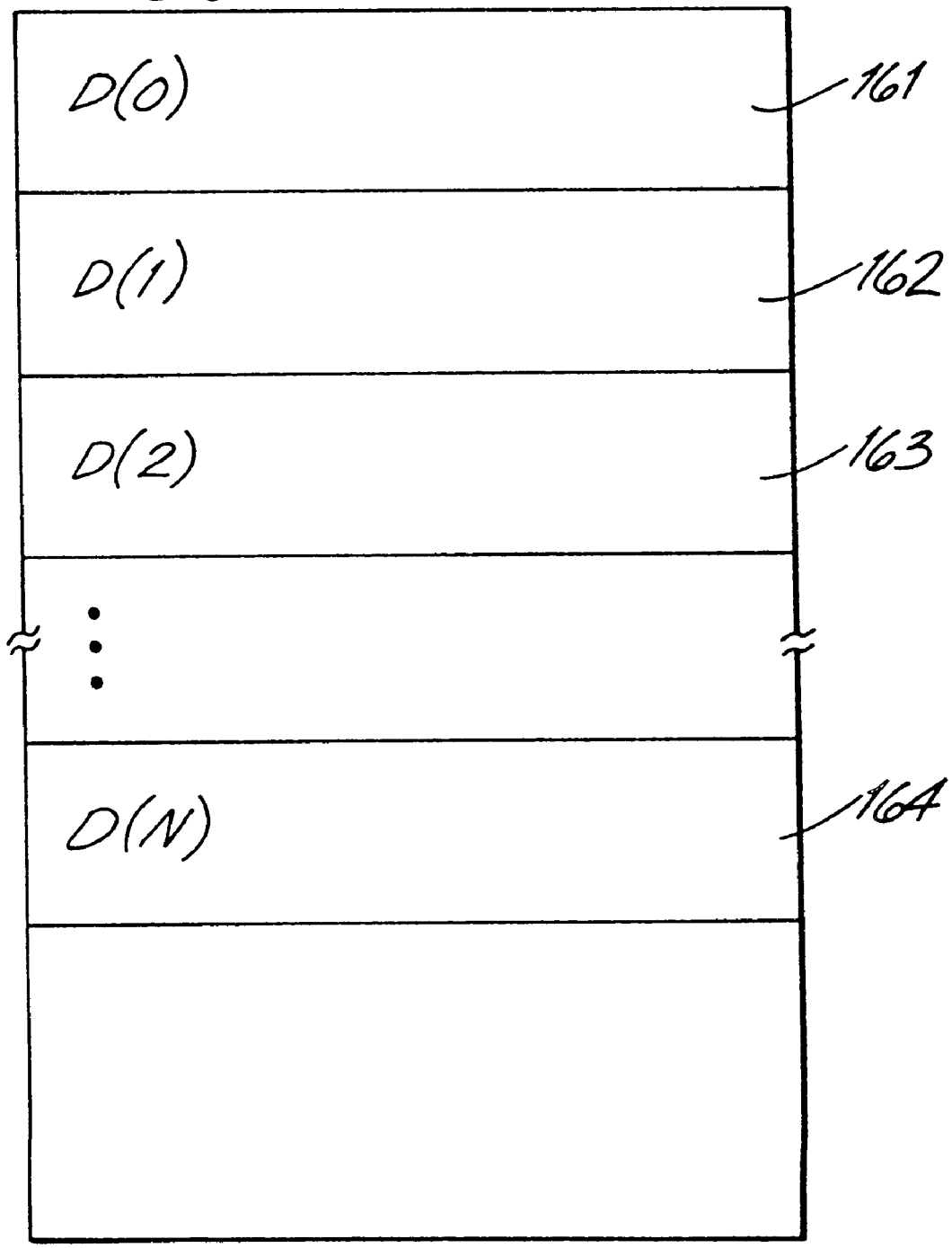
FIG. 6A is a drawing showing the format of a directory according to the present invention.

The directory written into VBI line 20, designated as element 144 in FIG. 5, has a format as shown in FIG. 6A. In the directory are entries D(0) to D(N), which are directory entries for each program. Each entry D(1) 161, and D(2) 162 to D(N) 164 is used to store information, as shown in FIG. 6C, concerning a program stored on the recording tape. For example, the program number 172, the start address 174, the end address 176, the record speed 178, and the compressed code 180 for recording at a later time a second program associated with the referred to as program number 172. Instead, a channel, date, time-of-day, and length 182 or a program identifier 184 can be used recording at a later time a second program associated with the program. The directory for a program can also contain the title for a program. The directory may be stored in one VBI line 20 or in multiple VBI lines, as required.

When the video cassette tape 20 is played in video cassette recorder 18, then the directory can be decoded by VBI decoder 24 and stored in random-access memory 32. The contents of the directory can be displayed on television 10 to allow the user to select a program on the tape for viewing. By decoding the tape identification number from the TPA packets, a library of tapes and contents of tape can be accumulated in random-access memory 32. The format 166 for the library can be as shown in FIG. 6B.

Figure 8:
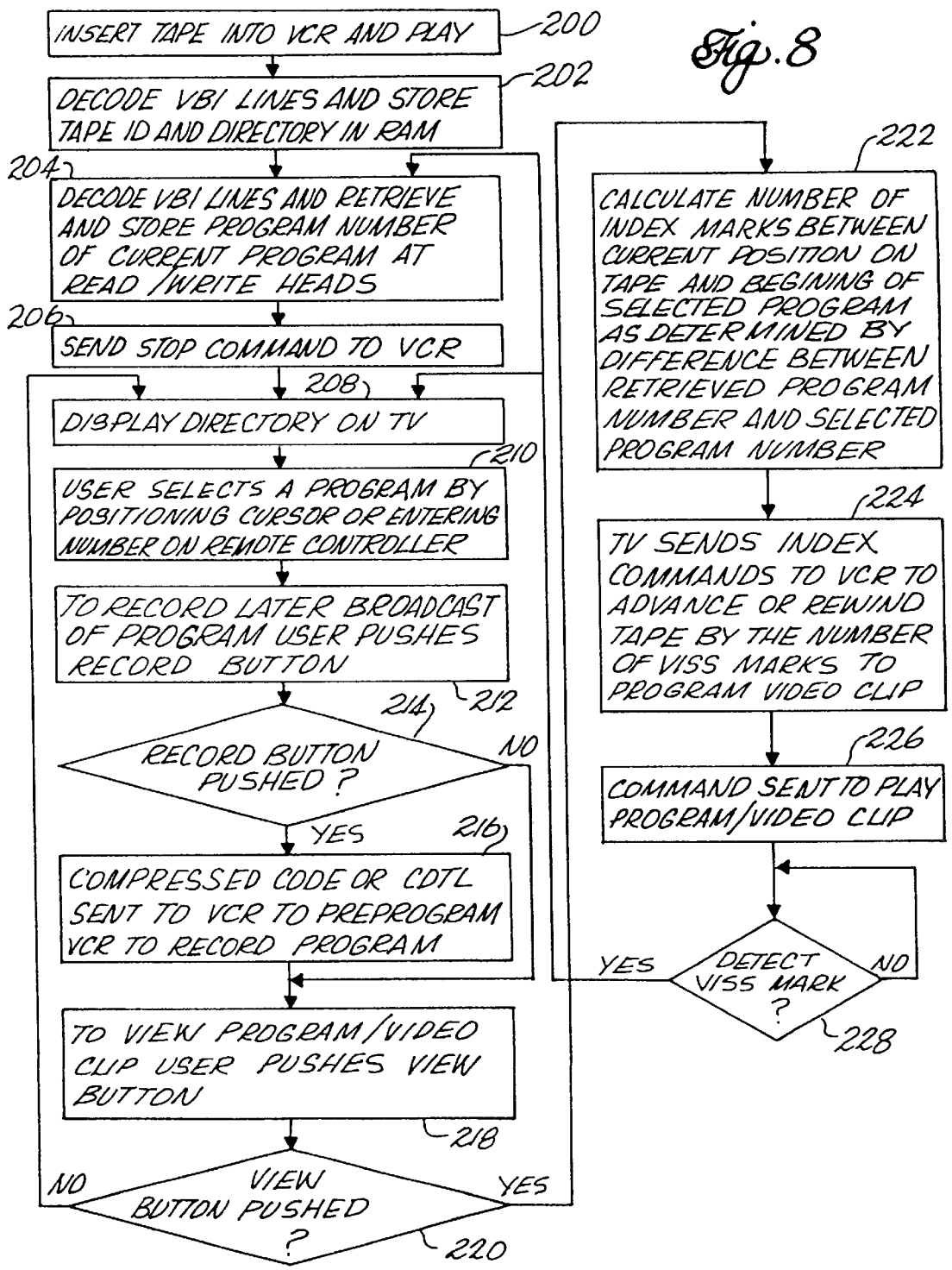
FIG. 8 is a flow graph of the steps for accessing programs and video clips on a magnetic tape according to the present invention.

The method for television 10 or controller 60 to control the video cassette recorder 18 to access programs on a video cassette tape 20 is described in the flow chart of FIG. 8. Step 200, a tape 21, having the format shown in FIG. 5 is inserted into VCR 18 and the VCR is put in a play mode. As the tape plays the VBI decoder 24 decodes the VBI lines and stores the tape identification and the directory on the tape into random-access memory 32 as shown in step 202. In step 204 the VBI lines are decoded and the program number of the current program at the read/write heads of VCR 18 is retrieved and stored in random-access memory 32. Then in step 206 a stop command is sent to VCR 18. In step 208 the microprocessor 26 via on-screen display controller 34 causes the stored directory to be displayed on the television monitor. In step 210 the user can select a program for viewing by either positioning a cursor on the program desired or entering a number on remote controller 12. For example, as shown in FIG. 9 the cursor can be put on to the program MURPHY BROWN or the user can enter the number 3 to view the program MURPHY BROWN. In step 212 to record a later broadcast of the program the user pushes the record button on remote controller 12. If the record button is pushed as determined in step 214, then in step 216, the compressed code for the channel, date, time-of-day and length for the selected program are sent to the VCR 18 to preprogram the VCR 18 to record the program when it is broadcast. For example, for MURPHY BROWN the compress code as shown on FIG. 9 is 5941. Also contained in this particular directory is the channel number, date and time-of-day which is channel 2, October 17, and 7:00 p.m. The length of the program is also shown for MURPHY BROWN to be 30 minutes.

To view a program or a video clip, the user pushes the view button in step 218. It is likely that a user will view a preview or video clip for a program first, and then decide whether he wants to record the program associated with the video clip at a later time. If in step 220 it is determined that the view button has been pushed, then in step 222, microprocessor 26 will calculate the number of index marks between the current position on the tape and the beginning of the selected program as determined by the difference between the retrieved program number and the selected program number. For example, if the retrieved program number is program 3, as shown in FIG. 5, then to access the beginning of program 1 the VCR 18 must rewind the video tape cassette by 3 VISS marks, so an index command of −3 is sent to the VCR. In step 224 the television 10 or the controller 60 sends the index command to VCR 18 to advance or rewind the tape by the number of VISS marks to the selected program or video clip. Then in step 226 a command is sent to play the selected program or video clip. While the program or video clip is playing the VBI decoder 24 continues to decode the vertical blanking interval lines and if a VISS mark is detected in step 228 then steps 204 and 206 are repeated and a directory again displayed on the television in order for the user to make another selection. At this time the user having viewed a video clip could decide to select the program associated with the video clip for later recording by the VCR 18.

FIG. 11A is a drawing showing another tape layout having an electronic guide with video clips according to the present invention. The tape has a control track 262, video and audio tracks 263 and vertical blanking interval 264 lines. As shown in FIG. 11A, the first length of the tape has VISS marks 266 and 267 in the control track 262. Between VISS marks 266 and 267 is a guide 270 in the video and audio tracks 263. As shown in FIG. 11A, the guide 270 consists of an index to video clips on the tape. For example, the first video clip is ALADDIN which will be shown on channel 2 on September 6th at 2:00 p.m. and has a length of two hours. The second video clip is WAR AND PEACE, which has a compressed code of 21596.

In the vertical blanking interval 266 lines is guide data associated with the guide. The guide data 272 includes for each video clip in the guide 270, the number of VISS marks from the guide to the video clip. Also, a compressed code associated with the video clip can be included within the guide data 272 or the channel, date, time of date and length (CDTL) or other program identifier can be included in the guide data for each video clip. The compressed code and the CDTL are used to preprogram a VCR to record at a later time a program associated with the video clip. After the end of the guide data is a still frame command 273.

If a cursor is used to select a video clip from the guide then a screen map 275 can be included in the guide data. The screen map 275 contains information that correlates each entry in the guide to a position on a displayed screen. As the user moves the position of the cursor the microprocessor 26, which processes the cursor commands from the remote controller 12, uses the screen map to know which entry in the guide is selected.

In a second length of the tape following the guide and the guide data, the first video clip 274 is written in the audio/video tracks 263 between VISS marks 264 and 268. Following the video clip, the guide is repeated, as shown by guide 278 in FIG. 11A and guide data 280 is written on the vertical blanking interval lines. The guide data 280 is not the same as the guide data 272, because the number of VISS marks to a video clip from guide data 272 is different from the number of VISS marks to a video clip from guide data 280. As shown in FIG. 11A the second video clip 282 follows guide 278 and guide data 280. The pattern of repeating the guide and guide data after each video clip is repeated across the tape.

As the tape is played on video cassette recorder 18 the guide is displayed on television 10 and the guide data is sent via VBI decoder 24 to random-access memory 32. At the end of the guide data is a still frame command. When this still frame command is decoded by the VBI decoder 24, the microprocessor 26 sends a still frame command via infrared emitter 40 and infrared detector 32 to video cassette recorder 18. The guide is then displayed as a frozen frame on television 10.

Figure 17:
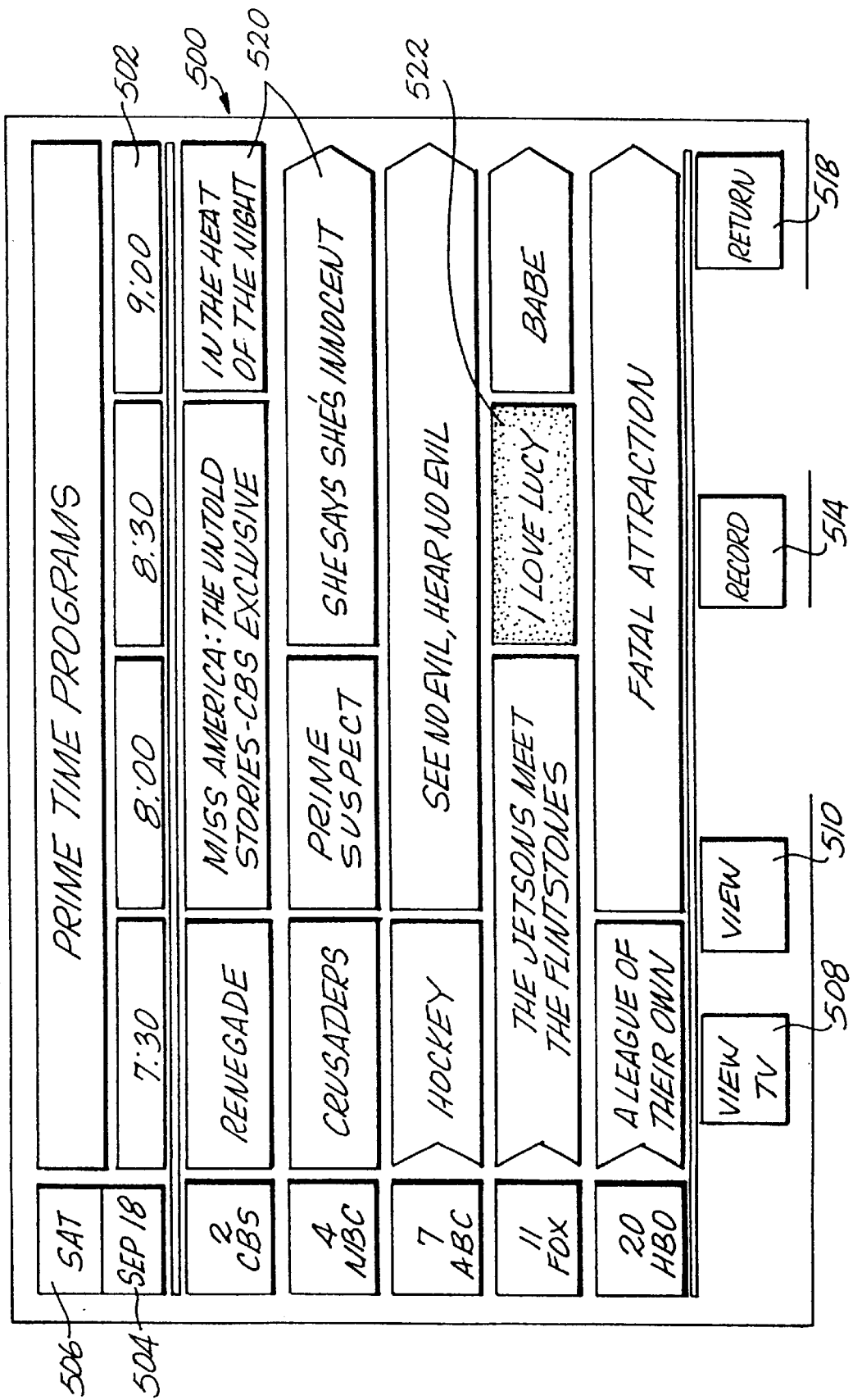
FIG. 17 is a drawing showing a display on a television of a video directory according to the present invention.

The guide can appear as text, similar to the program guide shown in FIG. 9, or can be a video frame as shown in FIG. 17. An advantage of the video frame is that the guide can have a more interesting appearance, use any font desired, and present a graphical interface to the user, such as those now common in personal computers. A video display is very useful for displaying Japanese or Chinese symbols.

To access a video clip the user pushes one of the number keys 44 and then pushes view key 46 on remote controller 12. It is also possible to use the cursor controls on remote controller 12 to highlight the desired program as shown by highlighted program 236 in FIG. 9 or highlighted program 522 in FIG. 17. The television 10 then sends index commands to video cassette recorder 18 via infrared emitter 40 and infrared detector 32 to advance or rewind the tape to the video clip selected by the user. This is accomplished by the microprocessor 26 in television 10 processing the guide data to determine the number of VISS marks forward or backward on the tape to the video clip selected by the user. For example, if guide 270 is displayed then to access video clip 282, the index command +3 is sent to advance the VCR to the beginning of video clip 282. If guide 278 is displayed then to access video clip 274, the index command −4 is sent to rewind the VCR to the beginning of video clip 274.

Figure 11B:
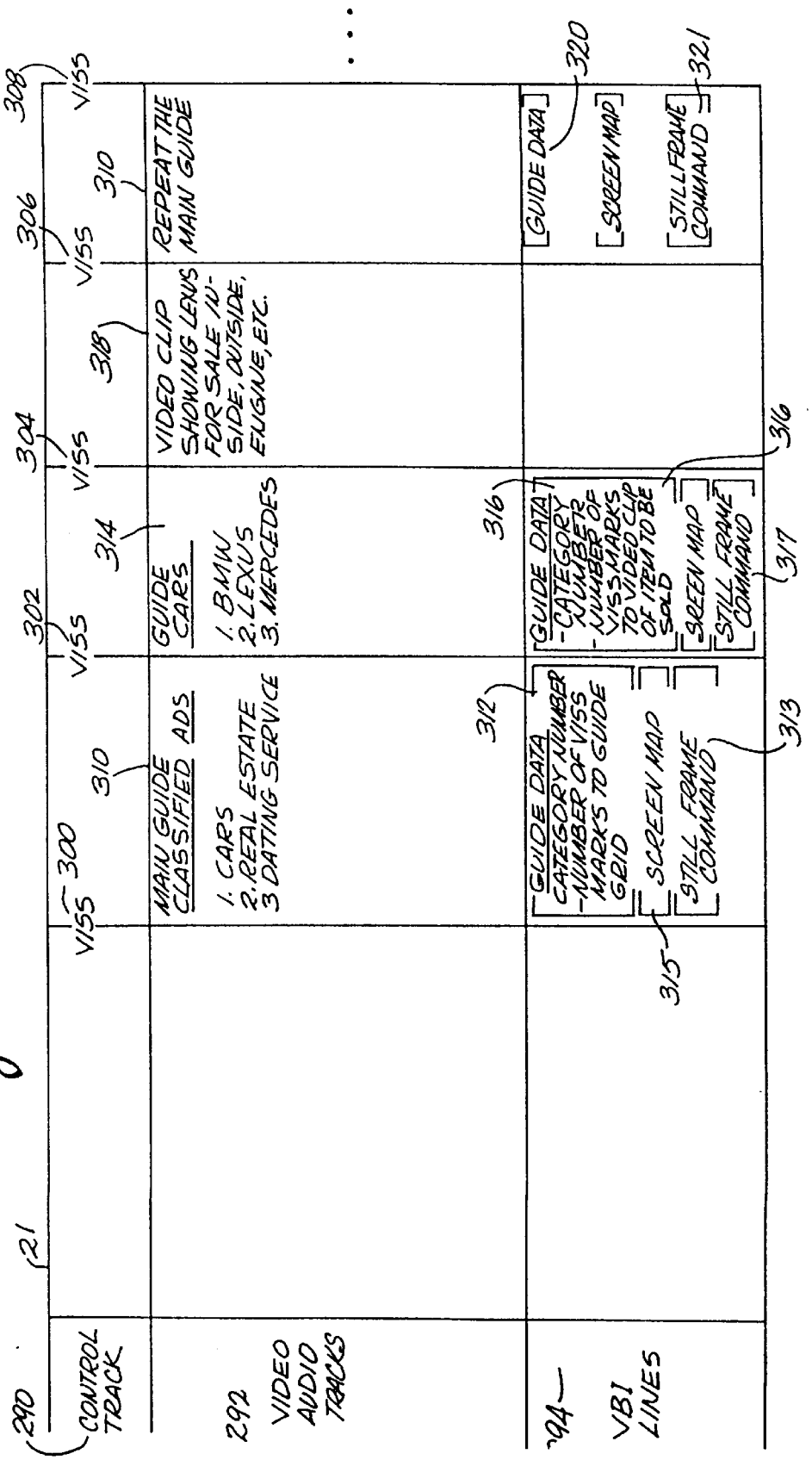
FIG. 11B is a drawing showing a tape layout having a hierarchy of guides and embedded guide data for providing access to video clips or infomercials according to the present invention.

FIG. 11B shows another tape layout. In FIG. 11B a main guide 310 is shown that can used to access another guide, such as guide 314. This permits a hierarchy of guides to be displayed. For example, in guide 310 if the user selects category 1 for cars, then guide 314 is displayed listing cars for which video clips are available, such as BMW, Mercedes, and Lexus.

The video clips can be used for showing previews of television programs or movies and also for classified advertisements and infomercials, such as for real estate. The video clip can also be arranged as a video magazine.

The method for the television 10 or the controller 60 to control the video cassette recorder 18 to access programs on a video tape cassette 20 is described in the flow graph shown in FIG. 12. In step 330 a video tape cassette 20 with tape 21 in the format described in either FIG. 11a or FIG 11B is inserted into the VCR 18 and the VCR is put into the play mode. In step 332 the guide data in VBI 264 lines of FIG. 11A or VBI 294 lines of FIG. 11B are decoded by VBI decoder 24 and stored into random-access memory 32. If a screen map 275 of FIG. 11A or screen map 315 of FIG. 11B is present to allow accessing a program using a cursor, then the screen map is also decoded from the VBI lines and stored into random-access memory 32. In step 334 it is determined whether still frame command 273 has been detected by the VBI decoder 24. If the still frame command has been detected then in step 336 the television 10 or the controller 60 sends a still frame command to VCR 18. This results in the guide 270 being frozen on the television monitor in step 338. In step 340 the user selects a video clip or program from the guide 270 by pushing a number key on remote controller 12 or positioning a cursor on the television monitor by using the remote controller cursor position keys. Then in step 342 the user can select to record a later broadcast of a program associated with the video clip or a program in the guide 270 by pushing the record button 48 on the remote controller 12. If it is determined in step 344 that the record button has been pushed, then in step 346 the compressed code or channel, date, time-of-day and length of the program to be recorded are retrieved from the guide data that has been stored in the random-access memory 32 and sent to the vide cassette recorder 18 to preprogram the VCR to record the program at a later time.

If the user wishes to view one of the video clips that are listed in the guide 270 then the user pushes the view button 46 in step 348. If it is determined in step 350 that the view button has been pushed, then in step 352 television 10 sends index commands to VCR 18 to advance or rewind the tape by the number of VISS marks to the selected video clip. For example, if WAR AND PEACE is selected from guide 270 then the corresponding guide data for clip number 2 would indicate that there are three VISS marks between the current position of the tape 21 relative to the read/write heads of the VCR 18 and the beginning of clip number two designated as element 282 in FIG. 11A. After the VCR 18 has advanced or rewind to the beginning of the video clip to be viewed, then in step 354 a command is sent to the VCR to play the video clip. In steps 332 and 334 are repeated and the user can select another video clip or program to view or record. Note that on FIG. 11A, after clip number two, designated as element 282 on FIG. 11A, that the guide 278 is repeated and that the guide data 284 is again present. There is a difference between guide data 284 and the guide data 272 because the number of VISS marks to a selected video clip is adjusted between the two guide data because of their position on the tape.

In the description so far it has been assumed that the user is provided with a video cassette tape that is prerecorded in a manner similar to the tape formats of FIGS. 5, 11A or 11B. One method of providing the user with a properly prerecorded video tape cassette is to deliver the tape along with another item that is regularly delivered to the user, such as a daily or weekly newspaper.

Another embodiment of the invention is to broadcast the programs and video clips rather than to provide them directly on a video cassette tape. The television 10 or controller 60 controls the recording of the broadcast on tape.

Figure 13A:
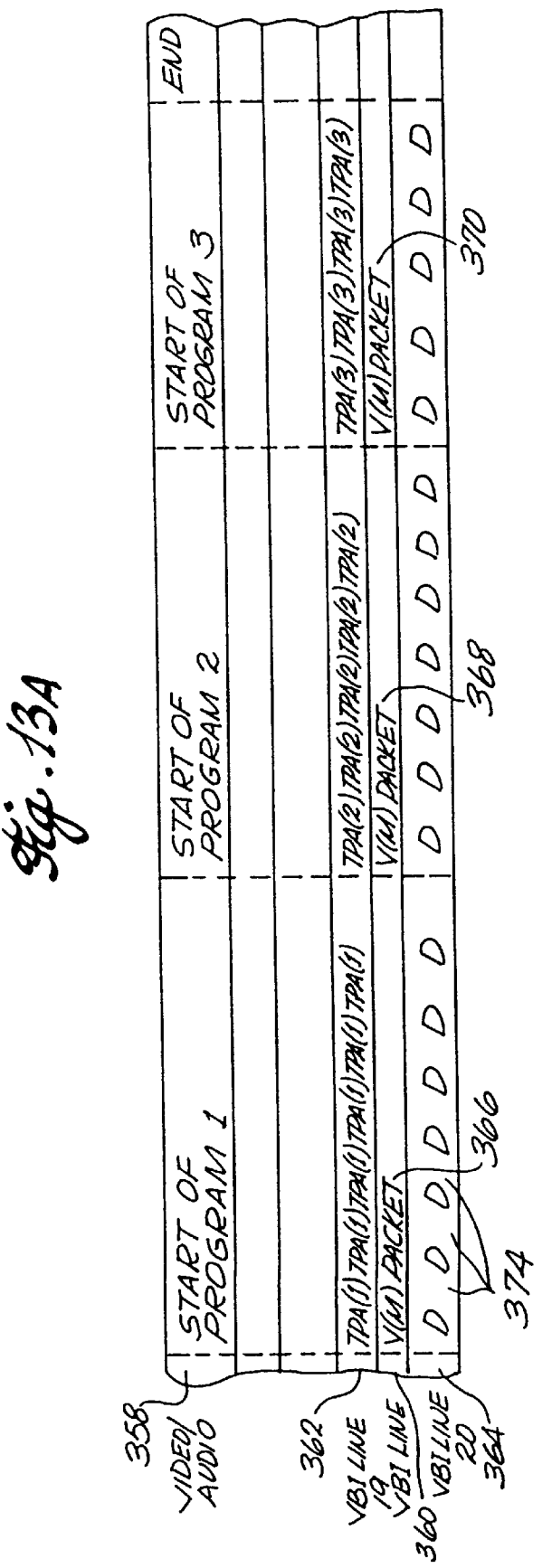
FIG. 13A is a drawing showing a broadcast format for a broadcast of programs and video clips according to the present invention.

FIG. 13A illustrates one layout of information in a broadcast. The broadcast layout has video and audio 358 for each program, TPA packets each containing a tape identification number and program number stored on a vertical blanking interval line 19, a directory broadcast in the vertical blanking interval line 20, and a V(M) packet broadcast in the vertical blanking interval lines at the beginning of each program.

The TPA packets 372, shown in FIG. 13A, contain a broadcast w identification number and a program number, which are similar to the tape identification number 188 and program number 190, as shown in FIG. 7, and are broadcast in vertical blanking interval line 19, designated as element 362 on FIG. 13A. The broadcast identification is a number that identifies the broadcast.

The directory 374 written into VBI line 20, designated as element 364 in FIG. 13A, has a format as shown in FIG. 6A and the information for each program can include entries such as the program number, the program title, and a compressed code for recording at a later time a second program associated the program number. For example, the video clip may be a preview for a movie that is to be broadcast later. The compressed code is used to program a VCR to record the movie at a later time. The directory may be stored in one VBI line 20 or in multiple VBI lines, as required.

V(M) packets 366, 368 and 370 are broadcast in a VBI line, referred to as element 360 on FIG. 13A, at the beginning of each program. The VBI decoder 24 can decode a broadcasted V(M) packet to detect the beginning of each program during the broadcast.

Figure 13B:
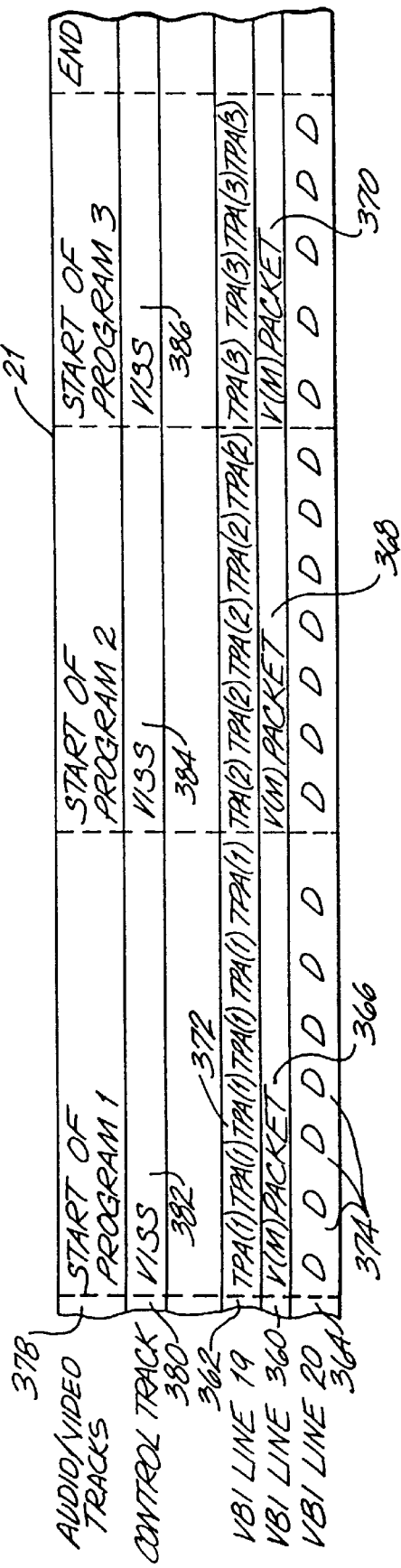
FIG. 13B is a drawing showing the tape format after recording of the broadcast on a VCR according to the present invention.

If the VBI decoder 24 detects a V(M) packet during a broadcast, then the television 10 or controller 60 commands the VCR to write a VISS mark into the control track of the tape. For the broadcast shown in FIG. 13A the result after detecting V(M) packets and commanding the writing of VISS marks is shown in FIG. 13B which shows VISS marks 380, 384 and 386 written into the control track 380 of the tape. The V(M) packets are still present in the vertical blanking interval line, so it is important that during a play operation that the television 10 ignores the V(M) packets so that the VISS marks are not written again.

Figure 14:
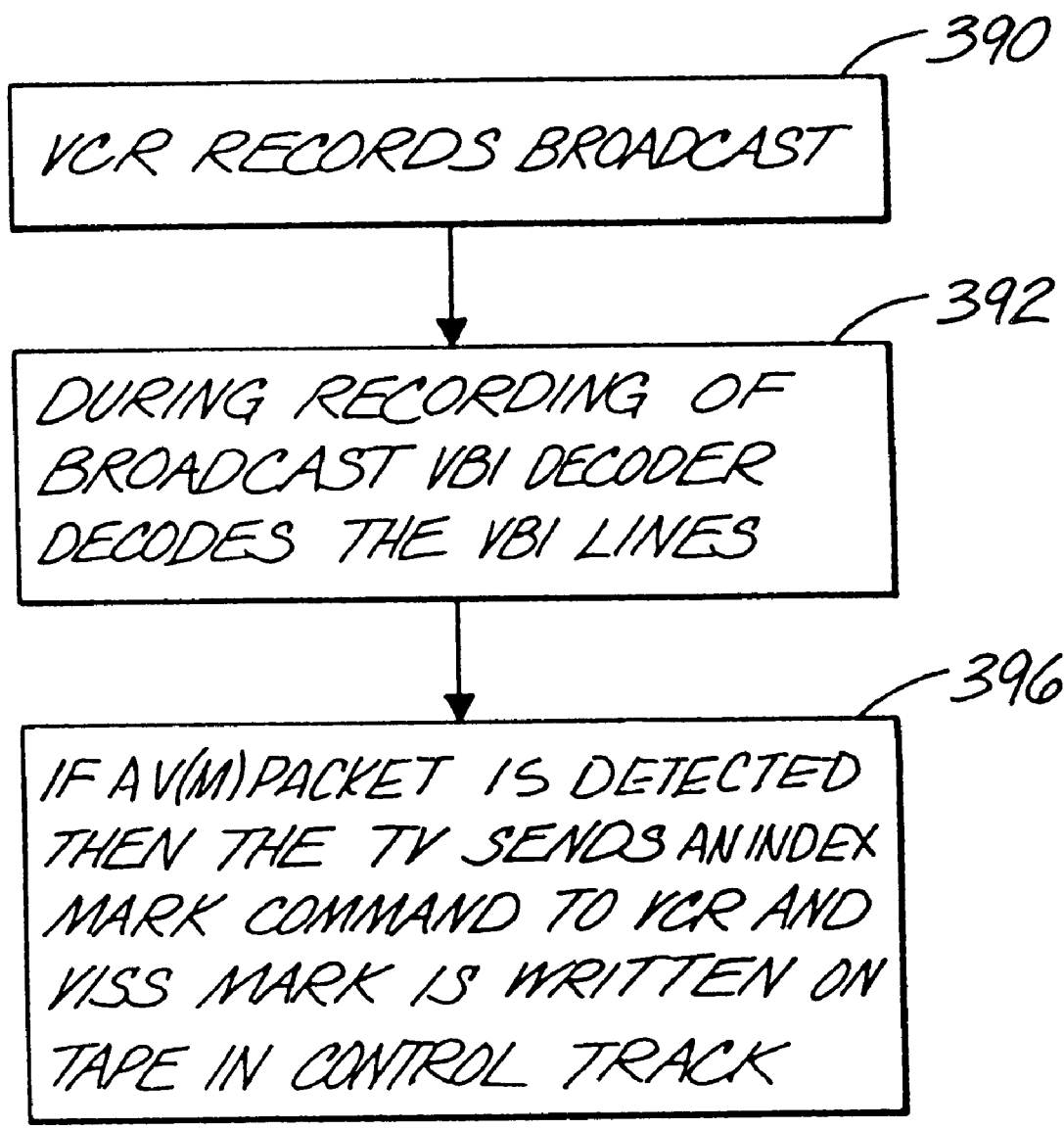
FIG. 14 is a flow graph of the steps for creating a tape during recording of a broadcast of programs and video clips according to the present invention.

FIG. 14 is a flow chart of the steps for controlling the recording of a broadcast. In step 390 the VCR is in the process of recording a broadcast. The television 10 or controller 60 knows the mode of the VCR because they command through the infrared detector 32 the VCR to play, record and the like. In step 392 the VBI decoder decodes the VBI lines, and in step 396 if a V(M) packet is detected then, because the television 10 knows the VCR is in a record mode, the television 10 sends an index mark command to the VCR 18 and the VCR writes a VISS mark on the control track.

A user can be charged either a sales fee or a rental fee for a pre-recorded video cassette tape. In the case of a broadcast other provisions have to be made in order to charge the user for the information in the broadcast.

Figure 15A:
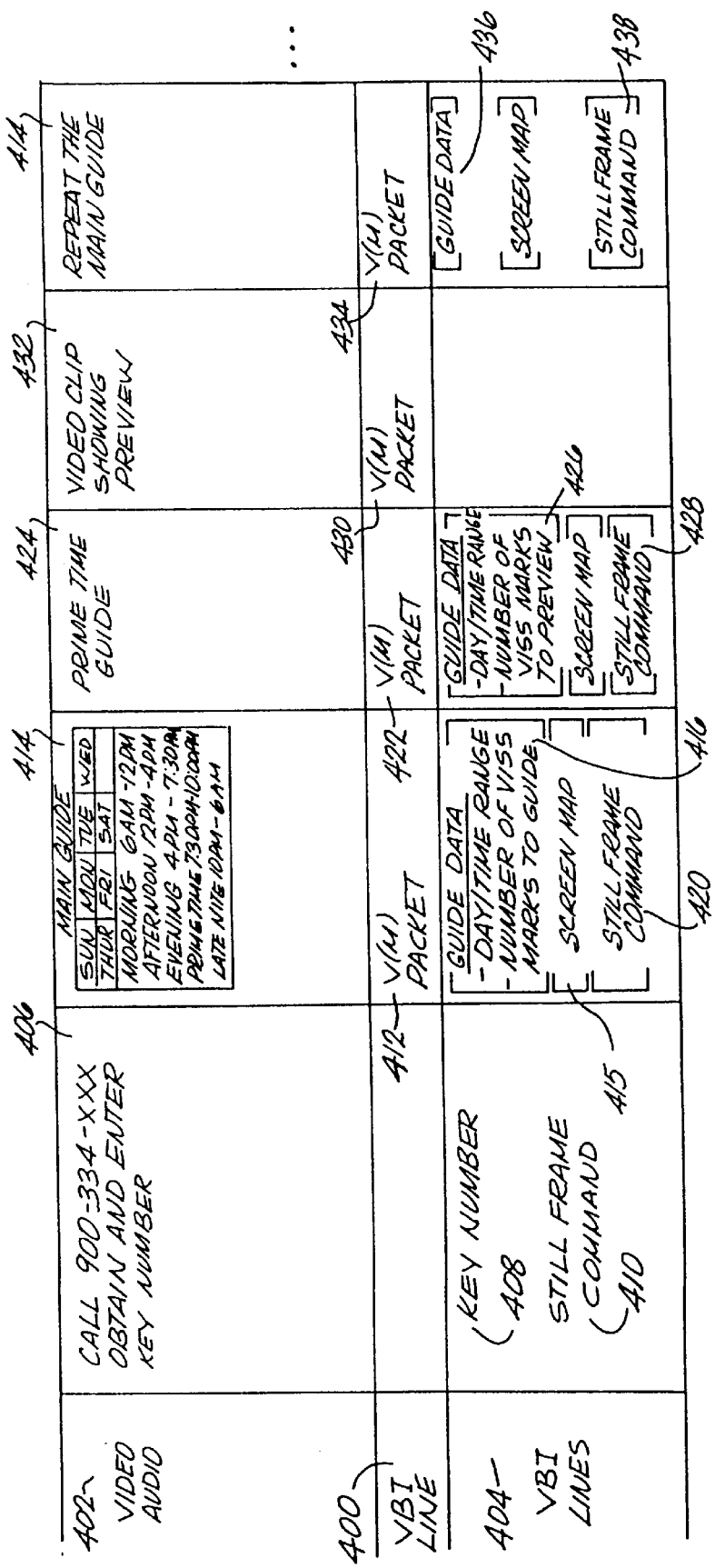
FIG. 15A is a drawing showing a broadcast format for a broadcast of programs, video clips, and/or a video directory according to the present invention.

FIG. 15A illustrates another layout of the information in a broadcast. The broadcast includes a video and audio portion 402. In the VBI line 400 V(M) packets are broadcast wherever a VISS mark is wanted on the tape. A message 406 is broadcast at the beginning of the broadcast and indicates to the user to call a 900 number to obtain a key number. A key number 408 and a still frame command 410 are broadcast in the vertical blanking interval lines, designated as 404 in FIG. 15A. Then a guide 414 and guide data 416 are broadcast. Guide 414 references other guides, in the same manner as FIG. 11B. For example, note that guide 414 is an index that includes "PRIME TIME" and that the guide data allows access to the guide 424, which is a detailed guide for that span of time. The guide data 416 is followed by a screen map 415 and a still frame command 420, which is recorded but otherwise ignored by television 10 or controller 60 during the broadcast.

The guide 424 could appear on the television screen as graphic display 500, shown in FIG. 17, which includes time-of-day 502, date 504, day of week 506, and programs 520. Buttons at the bottom that the user can select, using a cursor, include view television 508, view 510, record 514, and return 518 to the previous menu. To select I LOVE LUCY the user would position a cursor on program 522. The view 510 and record 514 graphical buttons operate in an analogous manner to the same named buttons on the remote controller 12.

Figure 15B:
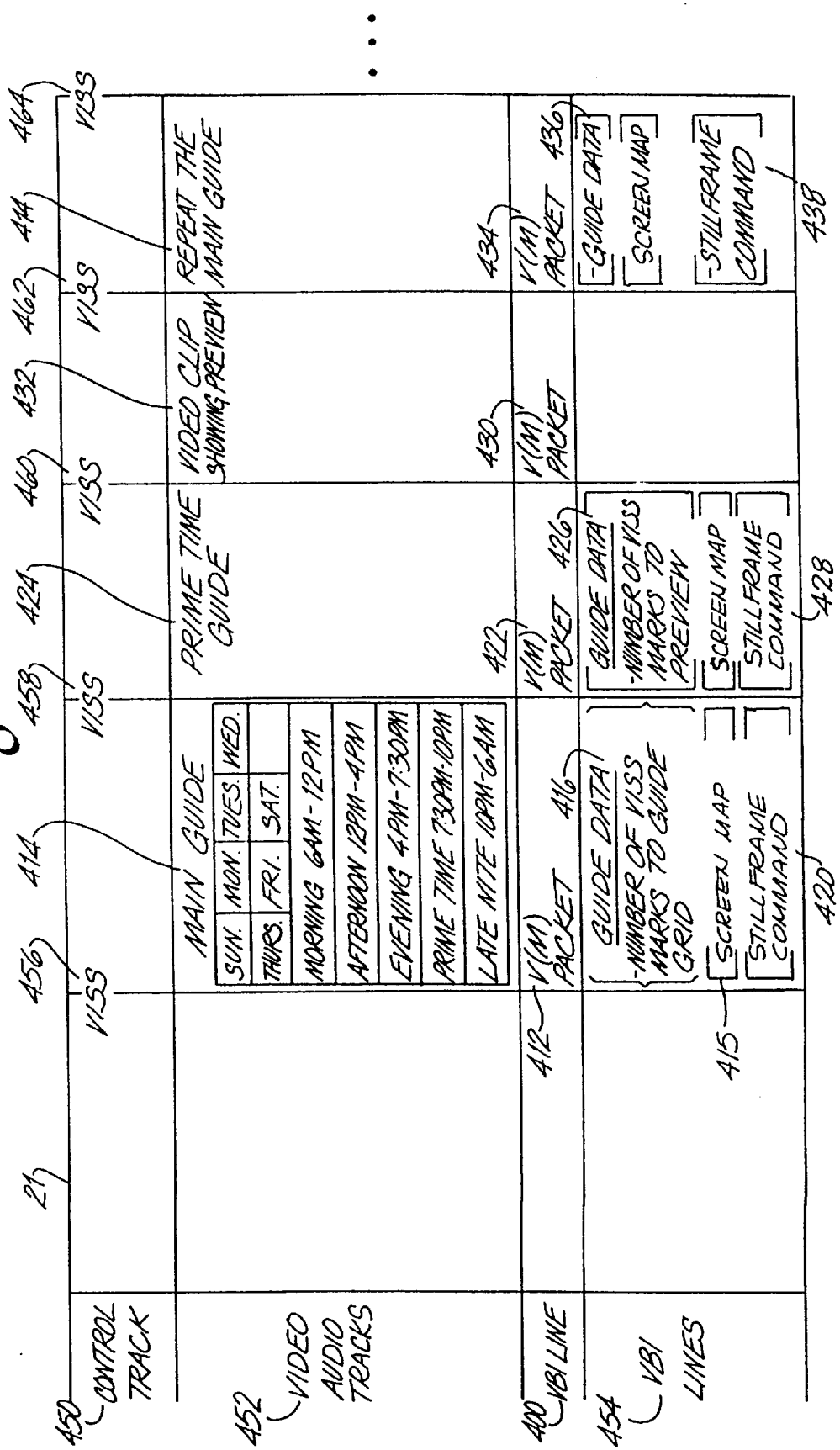
FIG. 15B is a drawing showing the tape format after recording of the broadcast of programs, video clips, and/or a video directory on a VCR according to the present invention.

If during a broadcast the VBI decoder 24 detects a V(M) packet, then the television 10 or controller 60 commands the VCR to write a VISS mark into the control track of the tape. For the broadcast shown in FIG. 15A the result after detecting V(M) packets and commanding the writing of VISS marks is shown in FIG. 15B. VISS marks 456, 458, 460, 462 and 464 are now written into the control track 450 of the tape. The V(M) packets are still present in the vertical blanking interval line, so it is important that during a play operation (which the television knows because it commanded the mode of the VCR) that the V(M) packets be ignored so that the VISS marks are not written again. After a broadcast in the format shown in FIG. 15A, and the recording of that broadcast as described above, it is necessary for the user to obtain a key number by calling a 900 number in order to initialize the recording. The steps in this method are described in FIG. 16. After the recording of the broadcast the video cassette tape is rewind in step 470, then in step 472 the VCR 18 is commanded to play the tape. As the tape is played the VBI decoder 24 decodes the vertical blanking interval lines to retrieve key number 408 as shown in FIG. 15A. When still frame command 410 is detected by the VBI decoded 24, a still frame command is sent to VCR 18 in step 476. Then in step 478 the message 406 is displayed to the user for the user to obtain a key number. In step 480 the user calls the 900 number to obtain the key number, and then in step 482 the user enters the key number on the remote controller 12. In step 484 the key number is sent to the television 10 or the controller 60, and in step 486 the entered key number is compared with the key number retrieved from the vertical blanking interval lines. If the numbers do not compare in step 488, then in step 490 the television 10 or the controller 60 are put into a mode of operation which does not allow the television or controller to properly access programs on the recorded tape. If the numbers do compare in step 488, then in step 492 the television 10 or controller 60 erase the message to obtain the key number as well as the key number 408 and the still frame command 410 from the recorded tape. This is done by sending a stop command to the VCR followed by a rewind command for about 30 seconds, another stop command, record command for about 45 seconds and then a stop command which effectively erases the message 406 and the key number 408 as well as the still frame command 410. After the initialization the format of the tape is as shown in FIG. 15B. This format is essentially the same as the formats of FIGS. 11A and 11B, therefore the method described in FIG. 12 can be used by television 10 or controller 60 to control a VCR to access program on the video tape cassette.

Thus, there has been described a television for controlling a video cassette recorder to access programs on a video cassette tape.

Figure 18:
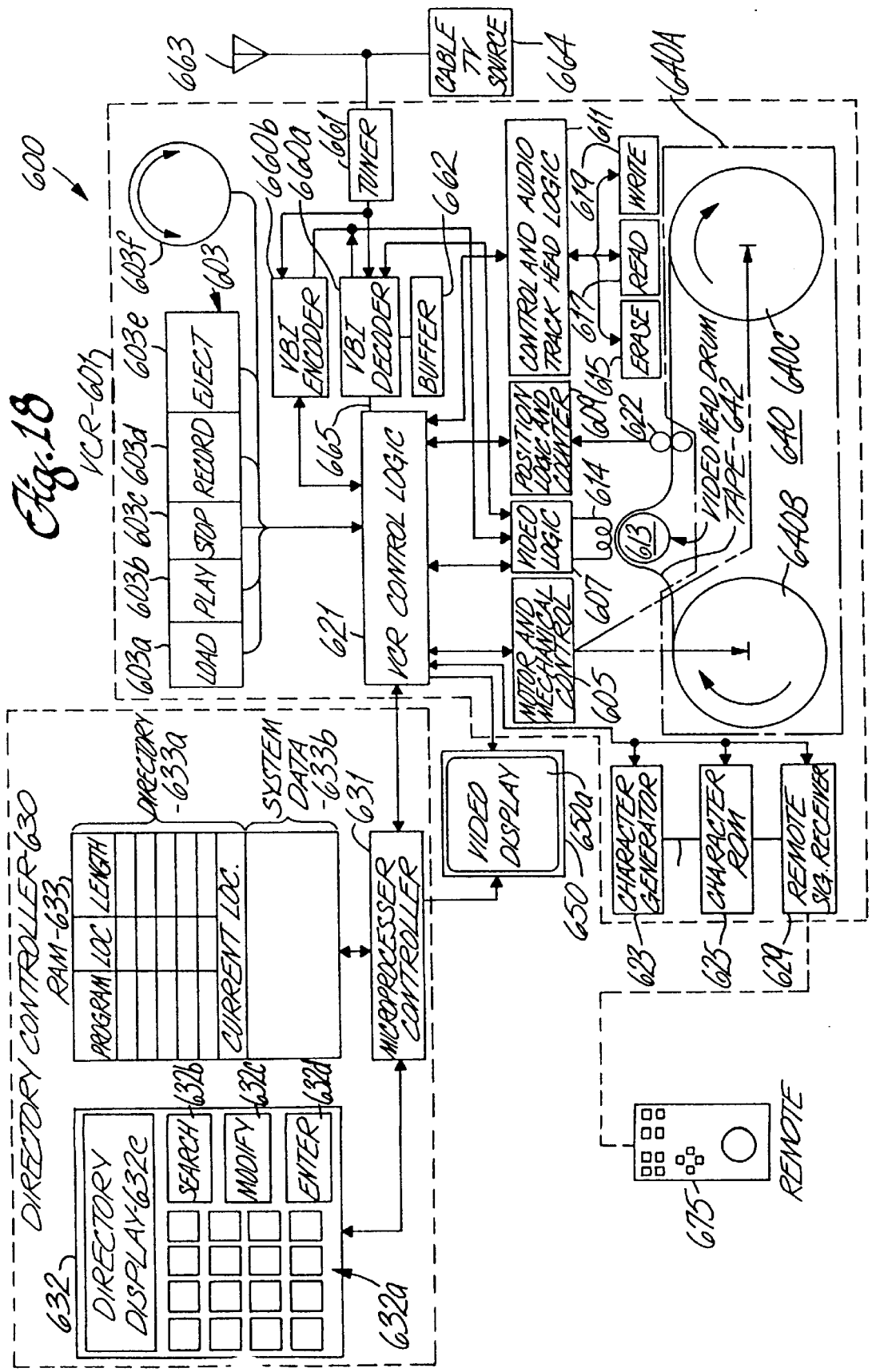
FIG. 18 is a block diagram illustrating an indexing video cassette recorder, using a hybrid indexing system that provides indexing of recorded programs for home recorded tapes, prerecorded tapes, and retroactively indexed tapes, of a standard video cassette format, and that has a directory controller, a bus interface and an output interface and embodies the invention.

FIG. 18 is a block diagram of an indexing VCR system 600 which may be used in conjunction with the concept of the invention. VCR system 600 includes a video cassette reader/recorder (VCR) 601 with a conventional video tape cassette 640, a video display 650, and a directory controller 630. The VCR 601 is a conventional indexing video reader/recorder device and uses any one of many different recording technologies. In particular, the VHS-C indexed tapes can be played directly on the indexing VCR 601 with full index functioning. The cassette 640 is a conventional video cassette having a magnetic tape 642 packaged in a cartridge or cassette housing (hereafter called cassette). Even though the size and design of the housing is different for different types of recording technology, the basic information that goes on the tape itself is similar. The technology and operation of a VCR are well understood in the art.

The VCR 601 has a button control panel 603 with control buttons, including LOAD 603a, PLAY 603b, STOP 603c, RECORD 603d, and EJECT 603e, for controlling the operation of the VCR 601. The LOAD button 603a is optional and is not used on machines which load automatically. The VCR control logic circuit 621 receives control signals from the button control panel 603 and controls the overall operation of the VCR 601 by sending control signals to a motor and mechanical control logic circuit 605, a video logic circuit 607, a position logic and counter circuit 609, and a control and audio track head logic circuit 611 of the VCR 601, as well as to the video display 650 and the microprocessor controller 631 of the directory controller 630.

The motor and mechanical control logic circuit 605 controls loading and ejecting of the cassette 640 and also controls movement of the video tape 642 within the video cassette 640 during recording, reading (playback), fast forward, and rewind. The video logic circuit 607 controls the operation of a video read/write head drum 613 in reading from or recording video signals to the tape 642. The electrical signals are magnetically coupled between the video logic circuit 607 and the video head drum 613 using a winding 614. The position logic and counter circuit 609 monitors tape movement through a cassette tape movement sensor 622 and generates signals that represent tape position. The control and audio track head logic circuit 611 controls writing, reading, and erasing of signals on the control or audio track of the tape 642 through the write head 619, the read head 617, and the erase head 615.

The directory controller 630 includes a microprocessor controller 631, a random access memory (RAM) 633 and a directory input/output display and control panel 632. Preferably the microprocessor controller 631 comprises an integrated circuit microprocessor, a program store, such as a read-only-memory (ROM), for storing a control program to implement methods of the invention, and a clock for generating a clock signal for timing functions and providing the time. The time may be set using the directory input/output display and control panel 632 in a manner known in the art. Alternatively, the VCR 601 may maintain the time. The RAM 633 is a conventional random access semiconductor memory which interfaces directly with the microprocessor controller 631. The RAM 633 is preferably non-volatile. Alternatively, the RAM 633 is battery backed up. A portion of the RAM 633 shown as system data 633b, is also used for storing the system software of the microprocessor controller 631. The RAM 633 is also used for storing the program directory 633a.

The directory input/output display and control panel 632 has an alphanumeric keyboard 632a and special function keys, such as a SEARCH key 632b for commanding searches for data in the directory 633a and on the tape 642, a MODIFY key 632c for modifying or deleting directory information in the RAM 633, and an ENTER key 632d for entering program directory information. Instead of providing special function keys, functions can also be initiated by entering predefined sequences of conventional keys on the alphanumeric keyboard 632a.

Display 632e of control panel 632 is a conventional liquid crystal, or other type of display, for displaying data being entered on the keyboard 632a, and to display the directory or other information stored in the RAM 633. Alternately, as discussed below, an on-screen display 650a can be used. The directory information stored in the RAM 633 is processed by the microprocessor controller 631.

The VCR 601 additionally comprises a character generator circuit 623 coupled to the VCR control logic circuit 621 and to a character generator read-only memory (ROM) 625. Character generators are well known in the art. Typically, the character generator ROM 625 stores a data table representing pixel or bit patterns of a plurality of alphanumeric characters, such as the Roman alphabet and the Arabic numerals. Upon command by the VCR control logic circuit 621 and the character generator circuit 623, the data in the character generator ROM 625 is read and placed in an output signal to the video display at a position on the display determined by coordinates generated by the microprocessor controller 631. The end result is visual display of an alphanumeric character on the display screen. Character generators are well known for channel display in television receivers, and for use in professional titling equipment.

As shown in FIG. 18, decoding can be implemented by coupling an input of a VBI signal decoder 660a to the output of a tuner 661 which is generally included in the majority of consumer VCR's for off-the-air recording. The tuner 661 receives a broadcast signal from an antenna 663 or a cable TV signal source 664. Both the decoder, the tuner, and the interaction of both, are conventional in the art. Examples of commercially available VBI decoders include the TeleCaption 4000 Adaptor, commercially available from National Caption Institute, Falls Church, Va., and Teletext Decoder, available from Norpak Corporation, Ottawa, Canada. A decoder signal line 665 is coupled from the decoder to the VCR control logic circuit 621 to carry decoded data to the control logic circuit. The VCR control logic circuit 621 is commanded by the microprocessor controller 631 to pass the decoded data to the directory 633a under control of a stored program in the RAM 633. The program then causes the information to be stored as a program title in the directory and displayed on the display 650.

VBI data is placed in a broadcast TV signal by a broadcast TV station in a continuous stream; a user of the VCR 601 cannot stop or slow down the stream without additional hardware. Thus, it is possible that the first data received by the antenna 663 is not the program title. This problem can be overcome by coupling a data buffer memory 662 to the decoder. Under control of the decoder, all VBI data received by the VBI decoder 660a is stored in the caption buffer and serially output to the VCR control logic circuit 621. Each data word is displayed in the directory, and the user presses the ENTER button to accept the word and store it as a program title.

Not only can the information (e.g., title, subtitle, program identification) transmitted during the VBI portion be displayed in real time or used to generate a program title for the directory, it can be utilized to further facilitate operation of the VCR. For example, by monitoring the transmitted title, the VCR can automatically detect the end of a program and stop recording thereto. Also by monitoring the VBI portion used for transmitting the title, the VCR can filter out (in recording a program) segments that are unrelated to the program (e.g., commercials), by temporarily stopping the VCR if changes in the title portion are detected.

It is disclosed in the preceding paragraphs that the VBI data may be broadcast at a relatively high repetition rate prior to broadcast, enabling a suitable decoder to detect the data. In the system of FIG. 18, the decoder 660a can be designed to receive and store in buffer 662 the program identification information from line 21 of field 2 of each frame. Using suitable logic, the program title and other information can be stored automatically in the directory 33a, without user intervention.

Figure 19:
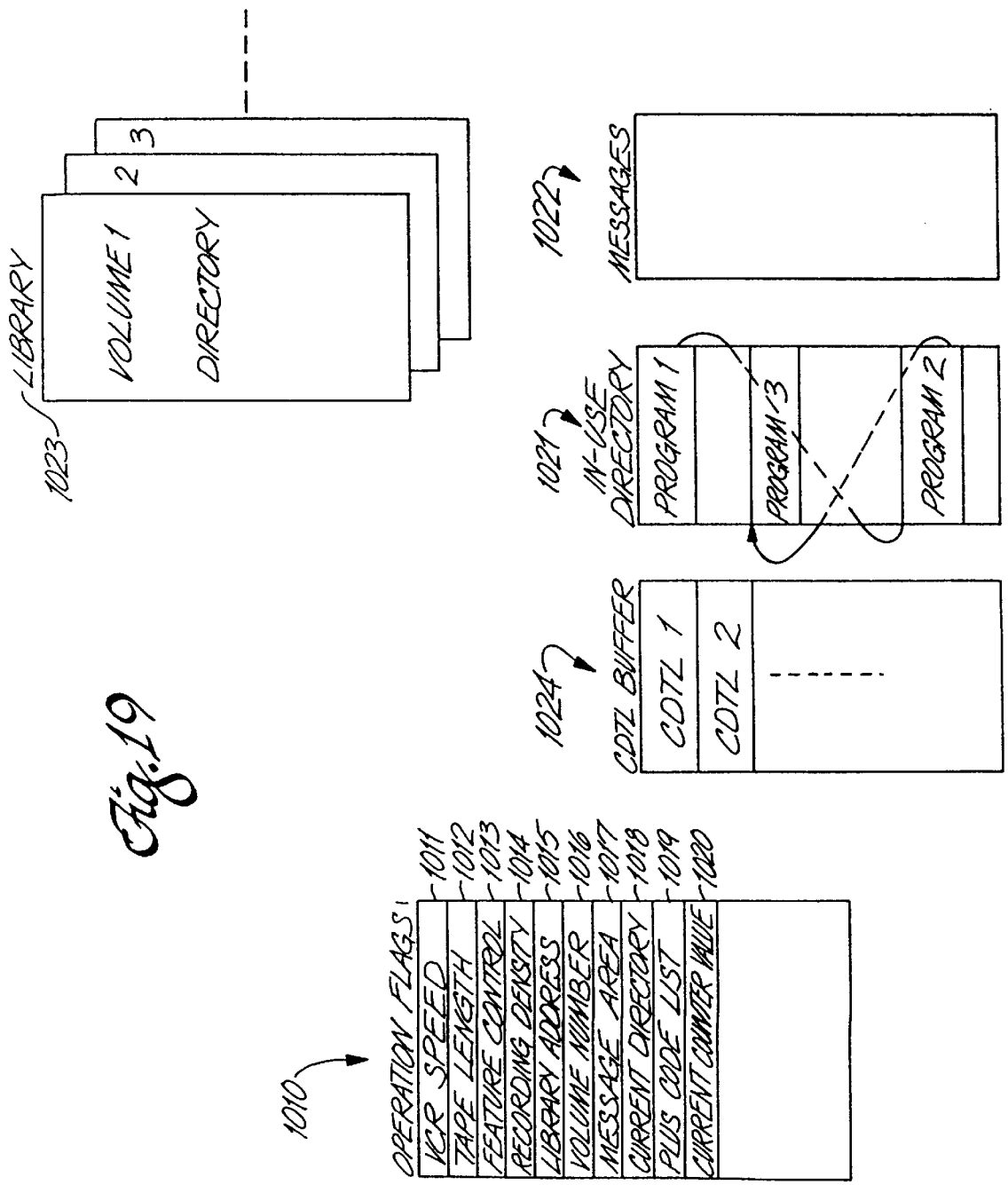
FIG. 19 is a schematic diagram conceptually illustrating the structure of data stored in the RAM of the directory controller of FIG. 18.

Now the memory structure of the RAM 633 is described by referring to FIG. 19 which is a schematic conceptually illustrating a typical structure of the data stored in the RAM 633. The RAM 633 can be viewed conceptually as having an area 1010 for storing operation flags. These flags include a mode flag (MODEFLAG) 1011 for indicating the operation speed (e.g., SP, LP, or SLP) of the VCR 601 and which will be changed whenever the operation speed of the VCR 601 is changed. A tape length flag (TAPELNG) 1012 indicates the length (e.g., E-60, E-90, E-120) of an inserted tape 642. A second memory flag 1014 (SECMEM) stores access information of a secondary memory which may be provided on the cassette 640 for storing directory information, as described in the co-pending application.

The flags also include a feature control field (FTCNTL) 1013 for specifying the VCR functions that are available to a user. In the simplest case, if a secondary memory is needed on the cassette for storing directory information, FTCNTL 1013 will be set in one way if an inserted cassette has the secondary memory and in another way if the inserted cassette has no secondary memory. FTCNTL 1013 may also specify other functions, and can be set by reading a code carried at a predetermined area of the cassette (e.g., on a magnetic strip on the cassette housing).

Area 1010 also stores a message pointer 1017 pointing to a message area 1022 which stores input and output messages; and a CDTL pointer 1019 pointing to a CDTL buffer 1024 which stores channel-date-time-length (CDTL) data of future recordings. A library 1023 is also provided in the RAM 33. The library 1023 stores directories of tapes which users of the VCR 1 have archived. Each directory stored in the library contains substantially the same information as the in-use directory. If a library is present, a library pointer 1015 is provided for pointing to the library 1023.

A directory pointer 1018 is also provided for pointing to an in-use directory 1021 which stores the directory of the currently inserted tape. This directory pointer 1018 may actually point to a location in the library wherein the directory of the tape is located.

In addition, the area 1010 also stores a volume number field (VOLNO) 1016 which stores a counter value representing the number of tape directories already stored in the library 1023. Other flags may be added as needed.

Figure 20:
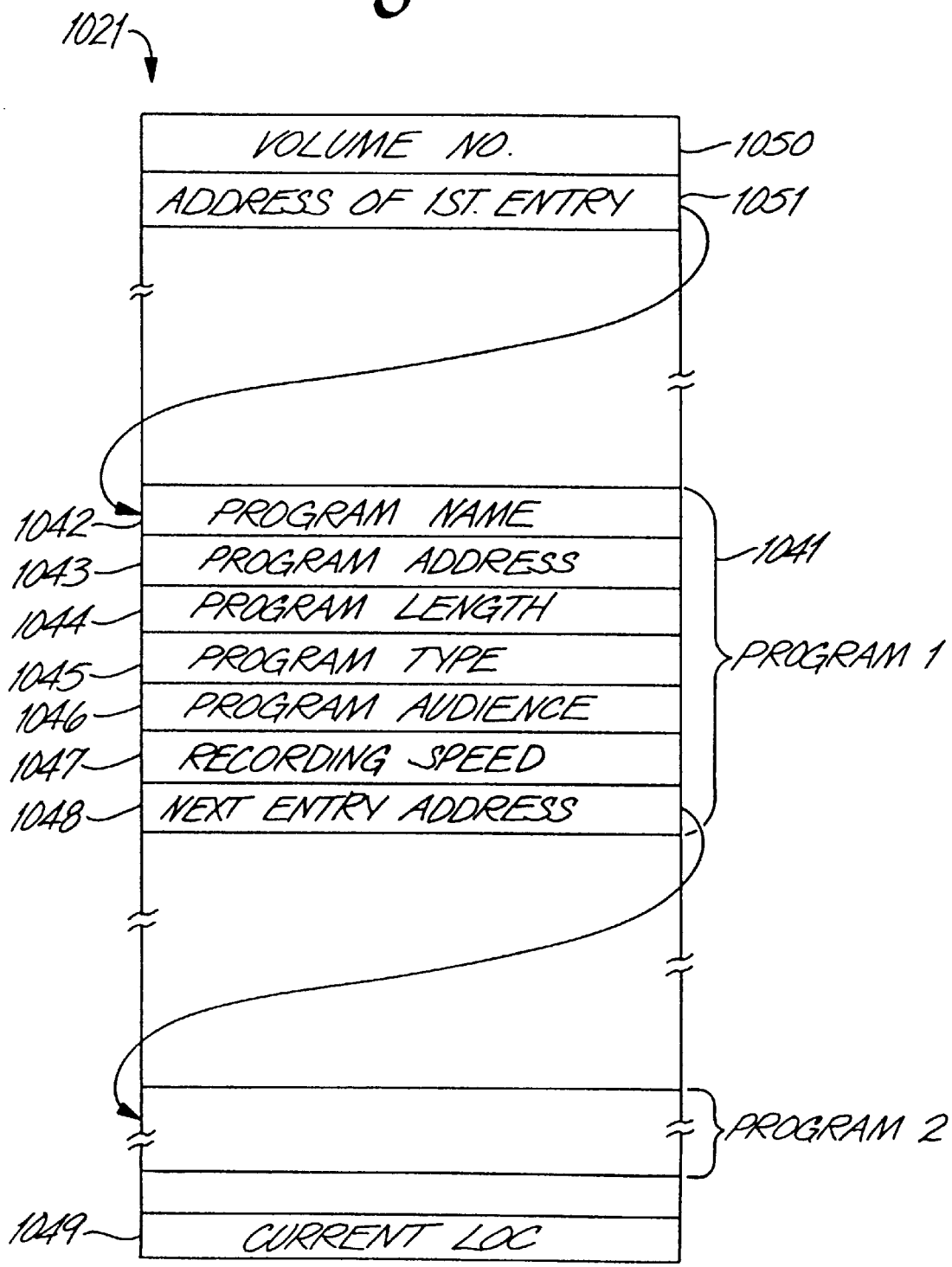
FIG. 20 is a schematic illustrating a conceptual structure of an in-use directory in the data structure of FIG. 19.

Referring to FIG. 20, which is a schematic illustrating a conceptual structure of the in-use directory 1021 in the data structure of FIG. 19, the in-use directory 1021 stores the directory of the cassette tape currently inserted into the VCR 601. For each program recorded on the cassette tape, a corresponding entry 1041 is set up in the in-use directory 1021. For purposes of illustration, FIG. 20 shows the entry 1041 only for program 1. However, each program similarly has an entry 1041. Each entry 1041 stores a title or program name (PROGRAM) 1042; a program address (LOC) 1043 which stores the absolute tape counter value of the beginning of the program; a program length value (LENGTH) 1044 which stores the length of the recorded program, represented as a function of the difference between its address from the address of the next program or record or a measure of time from a fixed reference point, such as the beginning of the tape; an optional program type field (TYPE) 1045 which stores the category of the recorded program; an optional program audience field (AUDIENCE) 1046 which stores the recommended audience of the program; and an optional recording speed (SPEED) 1047 which stores the speed at which the program is recorded.

A current tape location (CURRENT LOC) 1049 is also stored in the directory for indicating the absolute position from the beginning of the tape 642 in the cassette 640 where the valid directory is located, or the value of the tape counter when the tape is ejected. This field is used for setting the tape counter when the tape is reloaded into the VCR 601. The recording on the tape of the absolute tape position is described below.

A field 1051 is a pointer pointing to the address of the first entry of the directory 1021 represented in FIG. 20 by an arrow pointing to the program name (PROGRAM) 1042. Each entry also has a field 1048 storing the address of the next entry in the directory also represented in FIG. 20 by an arrow pointing to program 2. These fields provide a link from one entry to the next entry and are used for facilitating search, deletion, and addition of entries. In the preferred embodiment, the directory information is not stored on the tape 642, but is retrieved from the library 1023. In this embodiment, a volume label (VOLNO) 1050 is provided in the in-use directory 1021. This field is used for retrieving the directory information of the tape from a library 1023 stored in the RAM 633.

Each item in the directory can be modified through the use of the buttons on the keyboard 632a and the special function keys 632b, 632c, 632d of the directory controller 632, as will be described below.

By way of background, the format of the tape 642 is now described. FIGS. 21 and 22 illustrate the information content of one example of video tape for both BETA and VHS format which both use the same general tape layout. The tape 642 is divided into three areas. A narrow strip running along the upper edge of the tape 642 is an audio track 642a which contains audio signals. A second narrow strip running along the bottom edge of the tape is a control track 642c which contains synchronization ("sync") control signals. The middle area 542b is for video signals which are recorded in pairs of parallel fields going up and down the width of the tape at a slight angle. The markers 710, 712, and 714 may be used to mark sections of the tape.

The video head drum 613 is fitted with two read/record heads 180 degrees apart, so that even numbered lines make up one field and odd numbered lines make up the other field. To reduce flicker on the video screen, these fields are projected onto the face of the cathode ray tube (CRT) screen 650a of the video display 650 at alternating intervals.

Video images in cathode ray tube (CRT) type video devices (e.g., television) are generated by scanning a beam along a predefined pattern of lines across a screen. Each time all the lines are scanned, a frame is said to have been produced. Each video frame is divided into two fields, referred to as field 1 and field 2.

The VCR control logic circuit 621 or the TV control circuitry scans the beam typically from the top, left-hand corner across the screen. After it finishes scanning one line, the beam returns to the left-hand side and scans along another line which is parallel to but lower than the previous line. The scanning continues until the beam reaches the center of the bottom part of the screen, thus completing the lines that form field 1.

From the bottom center of the screen, the beam returns to the top, where it starts scanning from substantially the center of the screen along lines which interlace the lines of field 1. These lines form field 2. When the beam reaches the bottom, right-hand corner of the screen, a picture frame is formed. In the NTSC protocol widely used in North America, each field contains 262.5 horizontal lines and a pair of fields constitute a single 525-line video frame and creates one video picture at one instant in time on the video display 650.

During the time in which the beam returns from the bottom to the top of the screen, it carries no video or picture signals and thus does not produce any picture element on the screen. This time interval is generally known as the vertical blanking interval (VBI). Its duration is generally several times and typically 21 times the time duration that it takes the beam to scan across the screen. In other words, the length of the VBI is equal to the time for the beam to scan several lines. Thus, the VBI typically contains a plurality of lines and is identified by the field with which it is associated. Apparatus and methods using these techniques are well known in the art and therefore are not discussed in detail herein.

Since no image element is produced on a television screen during a vertical blanking interval, proposals have been made to use the VBI for conveying auxiliary information from a television network or station to the audience. For example, Closed-Caption data associated with a television program are transmitted as encoded composite data signals during VBI line 21, field 1 of the standard NTSC video signal, at a rate of 480 bits per second.

By way of background, the data in the vertical blanking interval can be described in terms of the waveform, its coding and the data packet. The closed caption data waveform has a running clock followed by a frame code, followed by the data. The coding of the data is non-return-to-zero (NRZ) 7 bit odd parity.

Under mandatory FCC requirements effective July 1993, televisions having a size 13" and greater must provide closed captioning in two closed captioning fields which are used for two languages in real time and two text mode fields. The text mode fields fill the entire screen with texts. The default mode is an open ended mode in which the page is first filled up and then scrolled up. The individual recipient of such data has no control over the data.

Caption data decoding is further described in the following specifications, which are hereby incorporated by reference herein: Title 47, Code of Federal Regulations, Part 15 as amended by GEN. Docket No. 91-1; FCC 91-119; "CLOSED CAPTION DECODER REQUIREMENTS FOR THE TELEVISION RECEIVERS"; Title 47, C.F.R., Part 73.682(a) (22), Caption Transmission format; Title 47, C.F.R. Part 73.699, FIG. 6; "TELEVISION SYNCHRONIZING WAVEFORM"; Title 47, C.F.R., Part 73.699, FIG. 17A; "LINE 21, FIELD 1 DATA SIGNAL FORMAT"; and PBS Engineering Report No. E-7709-C, "TELEVISION CAPTIONING FOR THE DEAF: SIGNAL AND DISPLAY SPECIFICATIONS".

Under the extended data services (EDS) proposed in the Recommended Practice for Line 21 Data Service, Electronics Industries Association, EIA-608 (drafts Oct. 12, 1992 and Jun. 17, 1993) (hereinafter referred to as "EIA-608 standard", the subject matter of which is incorporated by reference, additional data is provided in line 21, field 2 of the vertical blanking interval. This requirement includes two closed captioning fields, two text mode fields and the extended data services. Table I shows the classification of data, the class control code, and the type code. The extended data includes, among other information, program name, program length, length into show, channel number, network affiliation, station call letters, UCT (universal coordinate time) time, time zone, and daylight savings time. In a typical distribution system upstream at the network, the network inserts the program name, the length of the show, the length into the show, the network affiliation, and the UCT time. Downstream at the affiliate, the affiliate inserts the channel number, the time zone, the daylight standard time and program names. The network inserts the data that does not differ for different affiliates.

The data is transmitted in packets. Six classes of packets are proposed in the EIA-608 standard, including: (1) a "Current" class for describing a program currently being transmitted; (2) a "Future" class for describing a program to be transmitted later; (3) a "Channel Information" class for describing non-program specific information about the transmitting channel; (4) a "Miscellaneous" class for describing other information; (5) a "Public Service" class for transmitting data or messages of a public service nature such as National Weather Service Warnings and messages; and (6) a "Reserved" class reserved for future definition.

According to the proposed EIA-608 standard, a packet is preceded by a Start/Type character pair, followed by information/informational characters pairs until all the informational characters in the packet have been sent.

Table I lists a subset of the control and type codes of various kinds of information to be broadcasted in the VBI according to the EIA-608 standard. For example, to transmit the program identification number (scheduled start time) of a program, a control code of 01 hex, a type code of 01 hex and a packet of four characters (one character specifying the minute, one character specifying the hour, one character specifying the date and one character specifying the month) are sent. Similarly, to transmit the program name, a control code of 01 hex, a type code of 03 hex, and a packet of between 2 to 32 characters are sent. As another example, the VBI may also be used to transmit a time-of-day value, by sending a control code of 07 hex, a type code of 01 hex, and a packet of two characters. The inserter stores data from the video stream and handles the insertion of such data into the video stream.

TABLE I

| Class | Class Control Code | Type |
|---|---|---|
| Current Class | | |
| Program Identification (scheduled start time) | 01 hex, 02 hex | 01 hex |
| Length/Time-in-show | 01 hex, 02 hex | 02 hex |
| Program Name | 01 hex, 02 hex | 03 hex |
| Program Type | 01 hex, 02 hex | 04 hex |
| Program Rating | 01 hex, 02 hex | 05 hex |
| Audio Services | 01 hex, 02 hex | 06 hex |
| Caption Services | 01 hex, 02 hex | 07 hex |
| Aspect Ratio Information | 01 hex, 02 hex | 09 hex |
| Composite Packet - 1 | 01 hex, 02 hex | 0C hex |
| Composite Packet - 2 | 01 hex, 02 hex | 0D hex |
| Program Description row 1 to 8 | 01 hex, 02 hex | 10 hex- 17 hex |
| Channel Information Class | | |
| Network Name (affiliation) | 05 hex, 06 hex | 01 hex |
| Call Letters (Station ID) and Native Channel | 05 hex, 06 hex | 02 hex |
| Tape Delay | 05 hex, 06 hex | 03 hex |
| Miscellaneous | | |
| Time of Day | 07 hex, 08 hex | 01 hex |
| Impulse Capture ID | 07 hex, 08 hex | 02 hex |
| Supplemental Data Location | 07 hex, 08 hex | 03 hex |
| Local Time Zone & DST Use | 07 hex, 08 hex | 04 hex |
| Public Service Class | | |
| National Weather Service Code | 09 hex, 0A hex | 01 hex |
| National Weather Service Message | 09 hex, 0A hex | 02 hex |

Referring back to FIG. 18, the microprocessor controller 631 controls the sequence and operation of the directory controller 630 and interfaces with the VCR control logic circuit 621 to implement the necessary functional capabilities for reading, updating and recording the directory. The microprocessor controller 631, according to a specific embodiment, is a microcomputer chip with part number of UPD 78234 from NEC Corporation.

The indexing VCR system provides a hybrid method for indexing recorded programs, which are recorded on a particular type of tape, such as home recorded tapes and prerecorded tapes. A home recorded tape (HR tape) is a tape on which the user has made recordings from broadcast or cable by either real time recording, timer programming his VCR, or using a VCR PLUS+™ programming system. As will be described below, the directory is created at the time of recording by the VCR. The second type of tape is a prerecorded tape (PR tape) that is a commercially purchased tape, such as a Raquel Welch work-out tape, a karaoke tape, songs, lectures or speeches, that contains many titles on it or may contain only one program. These tapes are not expected to be overwritten. The directory is stored on the tape by the video publisher at the time of the recording.

Each tape has a tape identification number (TID) written at some repetition rate along the whole tape on a VBI line for both home recorded and prerecorded tapes. The TID's reference the tape to a corresponding directory stored in the RAM 633. After the tape is inserted into the VCR, the VCR identifies the type of tape and locates and retrieves the corresponding directory from the RAM 633 or from the tape itself.

The VCR 601 shown in FIG. 18 also comprises a remote controller unit 675 which communicates through wireless means with a remote signal receiver 629 in the VCR. As is known in the art, the remote controller comprises a plurality of push buttons, switches, and a jog shuttle knob which create output signals. The signals are transmitted by wireless means known in the art, such as infrared transmission or radio-frequency signals, to the remote signal receiver 629. The receiver 629 decodes the received signal and passes the decoded data to the VCR control logic circuit 621.

Figure 23:
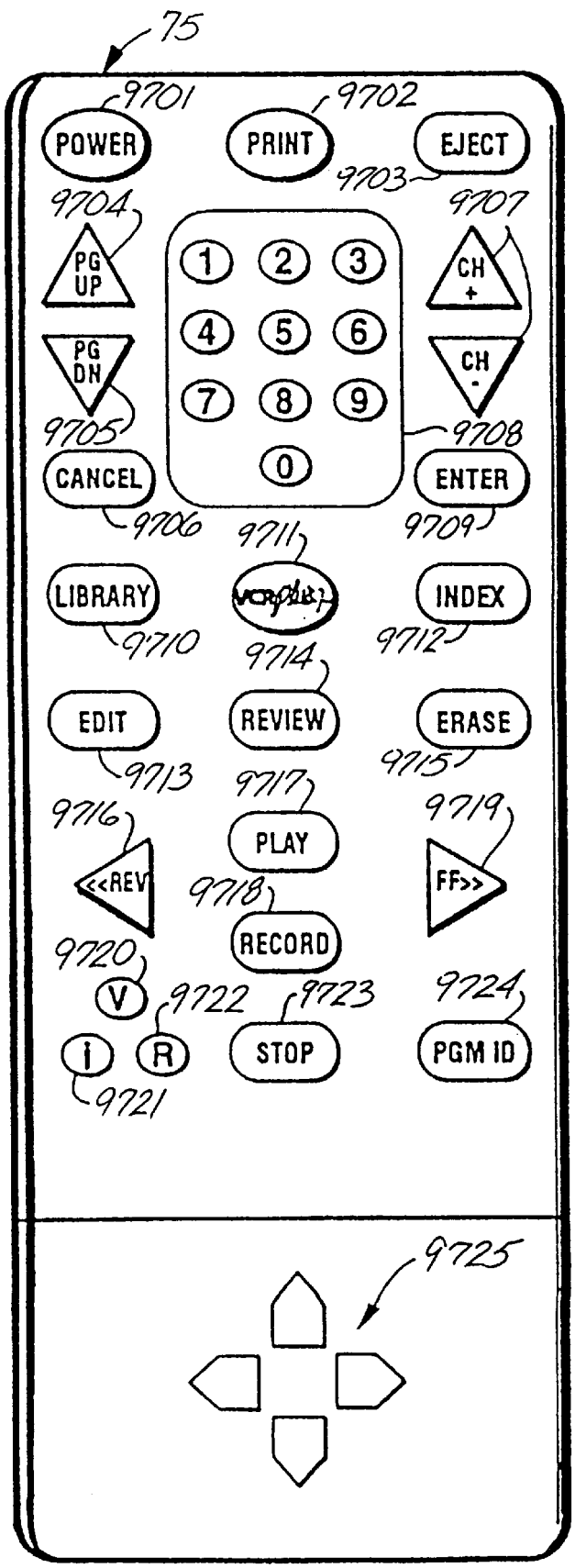
FIG. 23 illustrates an embodiment of a remote control unit for operating the indexing VCR of FIG. 18.

FIG. 23 is a schematic diagram of the remote controller 675 for the VCR of FIG. 18. The remote controller 675 has a plurality of push buttons or keys 9701–9725. A power switch 9701 enables turning power to the VCR 601 on and off. An eject button 9703 is used to eject the cassette 640 from the VCR. A page up button 9704 and a page down button 9705 are used to move up or down pages on the screen. A cancel button 9706 is used to cancel selections made. Channel change buttons 9707 enable toggling the channel selection up and down. A number keypad 9708 is used to enter numbers for commands and selections. An ENTER button 9709 is used to enter channel numbers and menu options in the methods discussed below. A library button 9710 is used to retrieve directories. A VCRPlus+™ button 9711 is used to enter "PLUSCODE™" numbers. An index button 9712 is used to enter an index mode.

An edit button 9713 is used to edit selections on the screen. A review button 9714 is used to review stored selections. An erase button 9715 is used to erase selections. A rewind button 9716, a play button 9717, and a fast forward button 9719 are used to control tape movement and are well known in the art. A record mode button 9718 enables selection of recording tape speed and to record programs. A stop button 9723 is used to stop movement of the tape. A program identification (PGM ID) button 9724 is used to display the program title and other information of the program being viewed either direct from cable or airwaves or from tape. A plurality of cursor movement or directional arrow buttons 9725, each shaped like an arrow, are used to move an on-screen cursor in various menu operations.

Referring back to FIG. 18, by using the VBI decoder 660a and the RAM 633, the indexing VCR 610 can capture data broadcast on the VBI and display it either concurrently with or at a later time to the data transmission. The broadcast data may be transmitted on a plurality of lines of the VBI including line 21. Per the E.I.A. specifications, Extended Data Services provide for pointers on line 21 (supplemental data location) to point to lines other than line 21. By using data on these other lines in the same format as data on line 21, the VBI decoder 660a can decode the other line data. In one instance this data may be a program guide. The program guide is the combination of the program ID's for a plurality of programs that will be broadcast in an upcoming predetermined time. In addition to the information included in the program ID, the program guide also includes the start times, the titles, and the "PLUSCODE™" numbers.

When a program is recorded on tape, for example, the program title is stored in the directory and also inserted in the VBI portion of the recorded program. A viewer can access the title of the program being shown by pressing the "Program ID" key. When the key is pressed, the microprocessor controller 631 sets the VBI decoder to decode selected field and lines of the VBI either from the broadcast signals or from the reproduced signals depending upon its mode of operation.

The program ID information for a plurality of viewed channels is stored in the RAM 633. Although some of the program ID information changes with the program (e.g., program title, start time, length, program category), this information is quickly retrievable from the memory when the user switches channels and requests the program ID to be displayed. Using the start time and length of the program, the indexing VCR 610 checks, periodically or in response to a Program ID command, whether the information is still within the valid time before displaying it on screen.

Information, such as a program guide, may be transmitted in the VBI and stored in RAM 633 or recorded on tape. In either case, it may be retrieved when desired for selection of programs for viewing or recording.

When the stored program guide is used to implement timer programming of the VCR, the user programs the indexing VCR 610 to record the desired program by entering on the remote controller the "PLUSCODE™" number for the program he would like to record. In response thereto, the indexing VCR 610 stores the "PLUSCODE™" number into its programming stack for execution as described above.

In yet another embodiment of the video magazine, the broadcaster broadcasts an electronic program guide wherein the electronic guide includes the program title, channel, date, and time of upcoming programs as well as an associated video clip that further describes a particular program in the program guide. Thus, the electronic program guide includes both the menus which may be grouped by category or theme, such as movies, sports, etc. and the video clips as full frame video. Accordingly, all the information displayed on the screen is transmitted as video. The display is not limited by the character generator in the VCR.

To produce an electronic guide, the broadcaster or guide producer creates graphics by computer or other electronic devices or by hand. The broadcaster then generates video images of the graphics by filming or recording. The video images are then broadcast as a video magazine. Along with the video images, the broadcaster transmits, in the VBI, addressing information for correlating the images on the screen with other video images, such as the video clips, "PLUSCODE™" number or channel-date-length-time corresponding to a program depicted in the guide with a future broadcast, and position information for correlating positions on the screen of the guide menu with the video clips.

Figure 24:
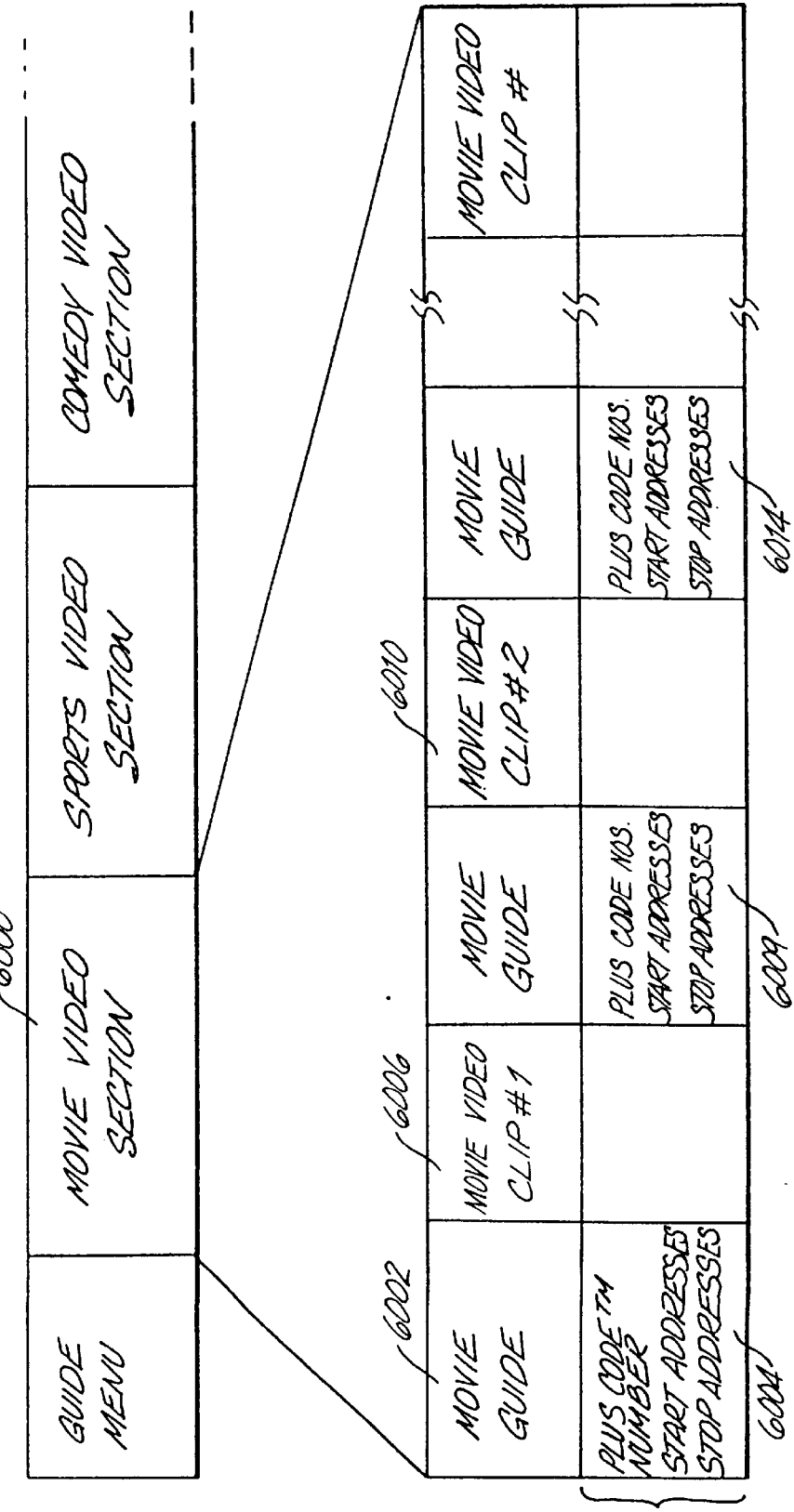
FIG. 24 is a schematic diagram illustrating the electronic program guide with a video grid and video clips with an exploded view of a movie guide portion of the guide.
Figure 26:
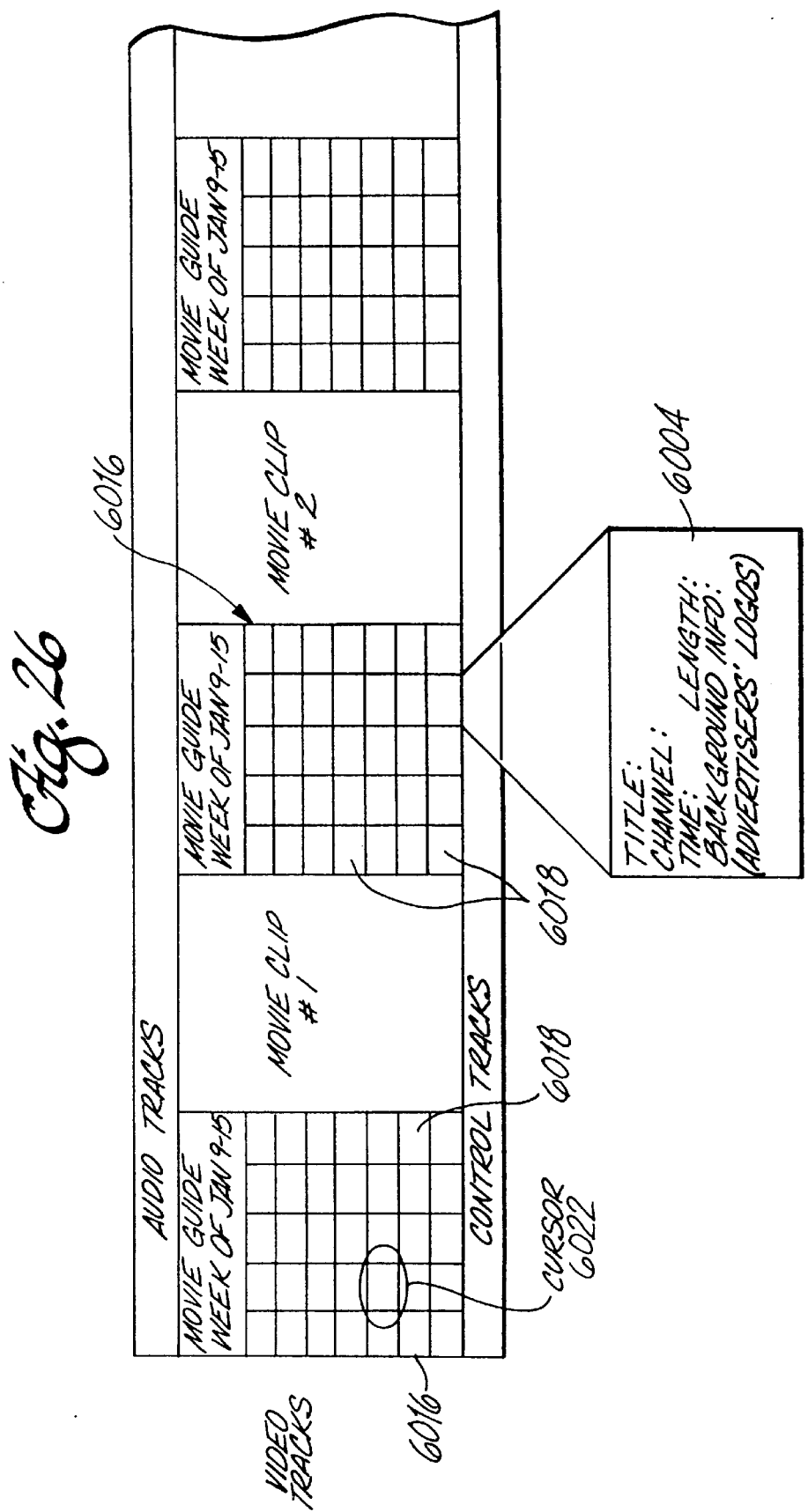
FIG. 26 is a schematic diagram of a movie guide portion of an electronic program guide received and recorded on the VCR in accordance with the invention where selection is by a cursor.

FIG. 24 is a schematic diagram illustrating the electronic program guide with a video grid and video clips with an exploded view of a movie guide portion of the guide. An electronic program guide 3740 has a guide menu and a plurality of video sections (also called video chapters). The guide menu contains information for the title and descriptions of the video sections (video clips) displayed in locations (or cells) arranged in a grid pattern on the screen. Along with the guide menu, the broadcaster transmits in the VBI the location of each cell of the grid and the start address and the stop address for the corresponding video section. Each video section represents the program listings for one of a plurality of categories of programs, such as movies, sports or comedy. Furthermore, each video section has a plurality of chapter menus 6002 spaced apart in time in the broadcast guide or along the tape after recording and a plurality of movie video clip sections 6006, 6010 between the video menus 6002. As part of the video menu, part of the information related to the upcoming programs for the associated broadcaster is transmitted or recorded as a video image. This information is arranged so that when the associated video is displayed, the information for each program of the menu is displayed in cells 6018 arranged in a grid 6016 on the screen (FIG. 26). This information may be in different fonts and colors. It may also include pictures of actors or scenes of the show or advertiser or show logos. Information 6004 relating to the position of each cell 6018 and the start and stop addresses for the corresponding video clip 6006, 6010 is transmitted in the VBI of the first video menu of the video section. The addresses may be timed at a particular tape speed or length. Also transmitted in the VBI is the "PLUSCODE™" numbers for the corresponding program.

Within each grid 6016, a plurality of programs and associated information are displayed in respective cells 6018 of the grid. The character generator in the VCR provides a cursor which may be superimposed over the video grid displayed on the screen. The portion 6016 of the representative recording on tape illustrated on FIG. 26 appears on the screen of the display, such as the TV. The program guide may have been recorded by the user's VCR or the tape with guide may have been purchased. In either event, the user controls the position of the cursor on the screen by using the remote controller. The microprocessor controller 631 tracks the cursor position and correlates it to the associated program and video clip for that position stored in the VBI.

Although shown pictorially in FIG. 24 as being along side the movie guide 6002, the information 6004, associated with each cell in the grid is transmitted in the VBI and stored in RAM 633 or recorded on tape in the VBI or on the control track. Preferably, after reading the VBI data, the microprocessor controller 631 stores this information in the RAM 633. Alternatively, the information in the VBI may be broadcasted with each subsequent video guide and read from the VBI as each subsequent guide is displayed.

Figure 25:
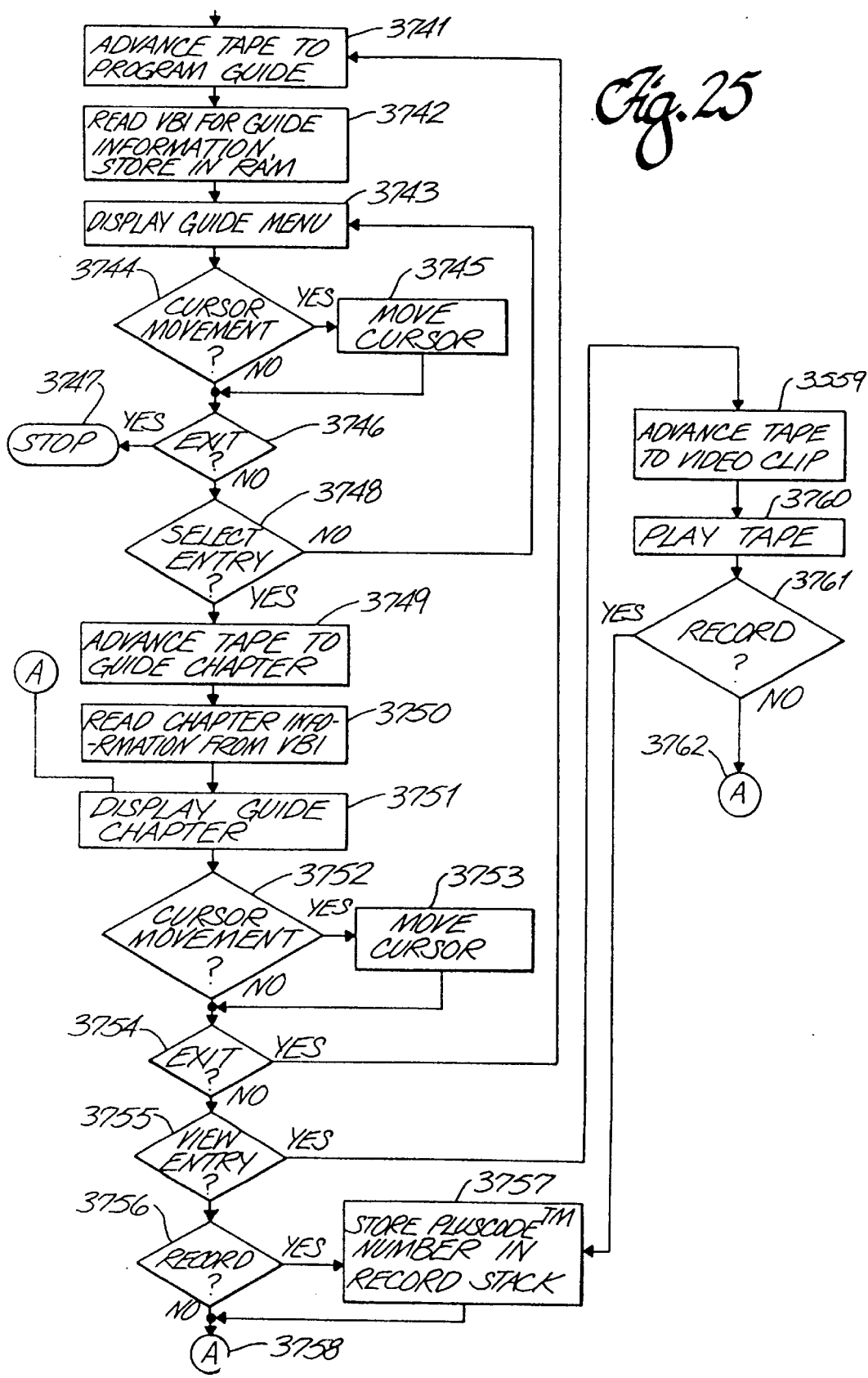
FIG. 25 is a flow chart showing the steps employed in the operation of the indexing VCR for an electronic program guide using a video grid and video clips where selection is by a cursor.

FIG. 25 is a flow chart showing the steps employed in the operation of the indexing VCR for an electronic program guide using a video grid and video clips with selection by use of a cursor. As a precursor to beginning the operation in FIG. 25, the user has selected the indexing function of the VCR and from the displayed directory selected the entry on the directory corresponding to the electronic program guide with video grids and video clips. In response to the user having selected the electronic program guide, the indexing VCR advances the tape to the beginning of the program guide, using the tape directory (step 3741). The VCR reads the vertical blanking interval for the guide information and stores it in the RAM 633 (step 3742). The guide information includes the start and stop addresses and the cursor location for each of the video sections. The guide information functions as the directory information. The indexing VCR reads the category guide menu from the video tape and displays it on the screen (step 3743). The length of the guide menu on the tape may be a single frame or frames covering several minutes. For guide menus having a few frames, the VCR is in the play and still frame mode allowing the user to browse the guide menu. Alternatively, the images of the still frame may be stored digitally and then displayed. If the guide menu contains multiple pages, the user advances pages by commanding the VCR to advance by using the frame advance button, or alternatively, a page button. In this mode, the VCR responds to a page command as it would a frame advance command. By using the cursor buttons on the remote controller 675 (step 3744), the user can move the cursor on the screen (step 3745). By pressing the exit button (step 3746), the user may return to the directory of the entire video tape (step 3747). Otherwise, the user selects from the category guide menu using the enter button to select the highlighted menu entry (step 3748). As an illustrative example, the selected entry will be described in view of the movie guide shown in FIG. 26. While discussed as a movie guide, this description also pertains to other guides. After the user selects the movie guide, using the addressing information, the VCR fast-forwards the tape to the position for the movie guide grid which it knows from the information read from the VBI. After the tape advances to the program guide (step 3749), the VCR reads the chapter information from the VBI where the chapter corresponds to the information for the movie video section (step 3750).

This information relates the position of each cell, the start and stop addresses, and the "PLUSCODE™" numbers for the corresponding video clip to the title of the program. The VCR stores this information in the RAM 633. The VCR displays the chapter guide for the movie video section (step 3751). By using the cursor keys (step 3752), the user moves the cursor through the chapter guide (steps 3753).

Alternatively, the user may exit the chapter guide and return to the guide menu (step 3754). If the user elects to view an entry from the movie guide (step 3755), the VCR reads from the RAM 633 the start address for the selected program and advances the tape to the video clip (step 3759). The VCR then enters the play mode and plays the video clip (step 3760). If the viewer wishes to record the program associated with the clip that he is viewing, the user presses the record button (step 3761).

In response thereto, the VCR reads from the RAM 33 the "PLUSCODE™" number associated with the video clip and stores the number in the record stack for later recording (step 3757). The VCR then advances to the guide chapter. If the viewer does not record a selection after the video clip, the video clip ends and by detecting the stop address of the video clip (step 3762), the VCR knows the detected video from the video tape is a movie guide and displays the guide chapter at step 3751.

From the guide chapter menu, the viewer may record the program without viewing the video tape (step 3756). In response to a record command, the VCR reads from the RAM 33 the corresponding "PLUSCODE™" number, stores it in the record stack (step 3757), and continues to display the guide chapter at step 3751.

The format of the broadcast information recorded on the video channel of the video tape in the VCR is shown in FIG. 26 as it relates, for example, to movies. The PRI, such as cursor position, PLUSCODE™, address of the movie clip, start/stop of the movie clip, is still transmitted, for example, in the VBI, as described above. This information may be recorded on the control track on the video tape. As an alternative, the PRI may be transmitted in the audio portion of the television signal and recorded on the audio channel of the tape. However, other information concerning the movie, such as the video clips, is transmitted as full frame video, as shown in FIG. 26.

Referring to FIG. 26, there is shown schematically how a movie guide portion of an electronic guide might be recorded on the video tape in the VCR. As shown, in the video portion of the tape, the recorded movie guide will be displayed in the form of a grid 6016 on the screen. The grid is arranged into a predetermined number of cells, for example 30, where such information as the channel, time, title, advertiser logo, and background information are displayed. Superimposed over the video grid is a cursor 6022 generated, for example, by a GS 102 chip, and controlled by the user using the remote control of FIGS. 18 and 23. The GS 102 keeps track of the cursor position so that it can correlate it to the movie data for that position as stored in the VBI.

Figure 27:
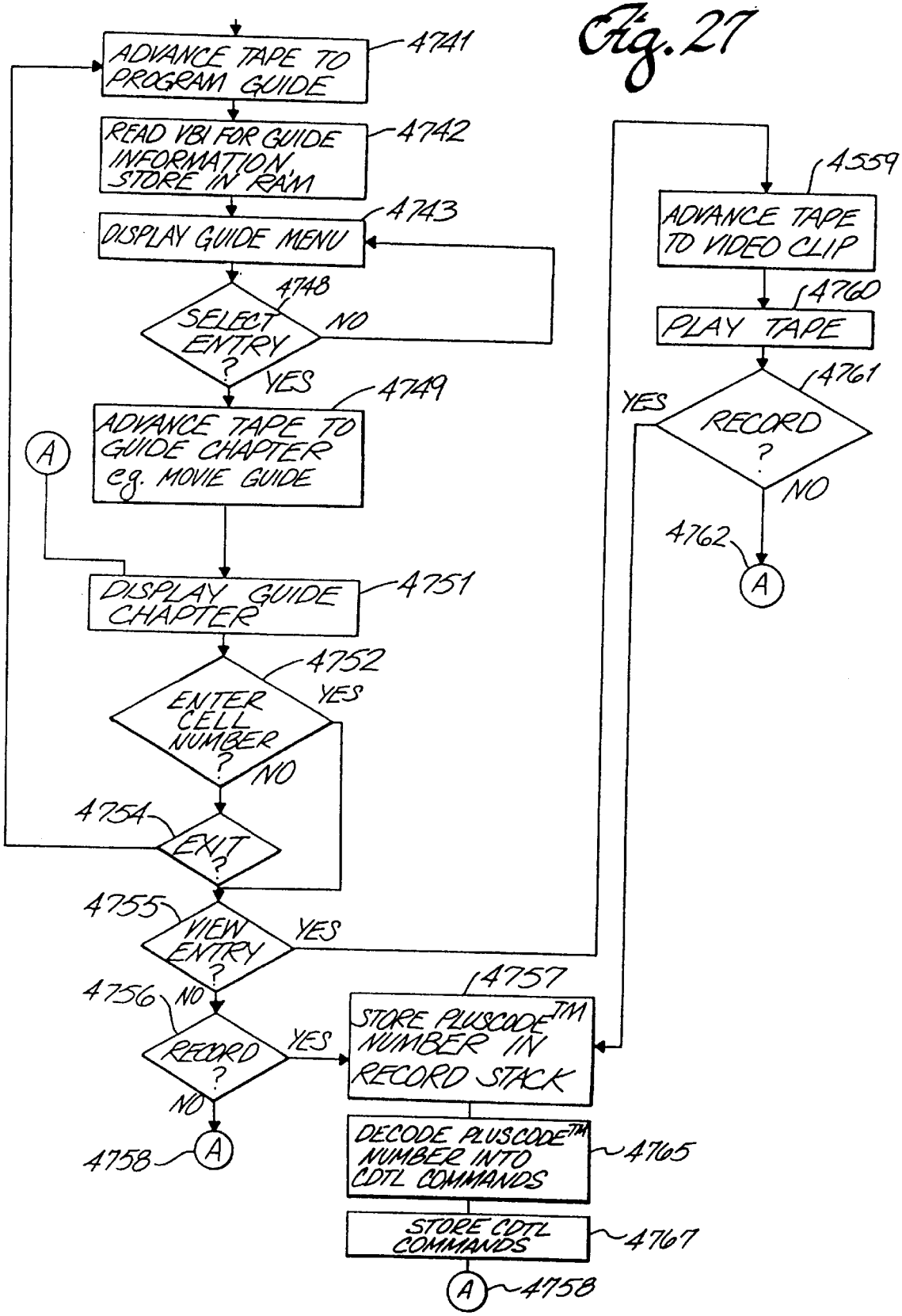
FIG. 27 is a flow chart showing the steps employed in the operation of the indexing VCR for an electronic program guide using a video grid and video clips where selection is by number of the numbered cells.

Alternatively, each cell 6032 may be numbered as shown in FIG. 28, and selected by the user following the steps of the flow chart depicted in FIG. 27.

The described embodiments of the invention are only considered to be preferred and illustrative of the inventive concept, the scope of the invention is not to be restricted to such embodiments. Various and numerous other arrangements may be devised by one skilled in the art without departing from the spirit and scope of this invention.

It is therefore intended by the appended claims to cover any and all such applications, modifications and embodiments within the scope of the present invention.

What is claimed is:

1. A method for controlling a video cassette recorder from a television to access programs on a video cassette tape, the method comprising the steps of:

providing a video cassette tape having a first length of video cassette tape having a first index mark written near the beginning of the first length and a second index mark written near the end of the first length, a guide to programs on the video portion of the video cassette tape written between the first and second index mark, and guide data written on the vertical blanking interval between the first and second index mark, the guide data associated with the guide including for each program contained on the video cassette tape a number of index marks either forward or backward on the tape from the guide data to the program; and providing a plurality of programs on the video cassette tape, each program having a third index mark written near the beginning of the program and a fourth index mark written near the end of the program.

2. The method of claim 1 further comprising the steps of:

playing the video cassette tape on the video cassette recorder and sending the video cassette recorder output signal to the television;

retrieving the guide data from the output signal with a video blanking interval decoder in the television;

detecting a still frame command in the output signal with a video blanking interval decoder in the television;

sending a still frame command from the television to the video cassette recorder to freeze the guide on the output signal; and displaying the guide on the television for the user to select a program from the guide.

3. The method of claim 2 further comprising the steps of:

commanding the video cassette recorder from the television to advance or rewind the video cassette tape to the selected program by advancing or rewinding a number of index marks according to the guide data associated with the selected program; and sending a command to the video cassette recorder to play the selected program.

4. The method of claim 3 further comprising the step of commanding the video cassette recorder to record at a later time a second program identified in the guide data associated with the selected program.

5. The method of claim 4 further comprising the step of decoding and expanding a compressed code, representative of, and compressed in length from, the combination of a channel, a date, a time-of-day, and a length for the second program.

6. The method of claim 1 further comprising the step of delivering the video cassette tape to the homes of users.

7. The method of claim 6 wherein the step of delivering the video cassette tape to the homes of users further comprises the step of delivering the video cassette tape along with a newspaper to the homes of users.

8. An apparatus for allowing a television to control a video cassette recorder to access programs on a video cassette tape, the apparatus comprising:

a video cassette tape having a first length of video cassette tape having a first index mark written near the beginning of the first length and a second index mark written near the end of the first length, a guide to programs on the video portion of the video cassette tape written on the vertical blanking interval between the first and second index mark, and guide data written between the first and second index mark, the guide data associated with the guide including for each program contained on the video cassette tape a number of index marks either forward or backward on the tape from the guide data to the program; and a plurality of programs on the video cassette tape, each program having a third index mark written near the beginning of the program and a fourth index mark written near the end of the program.

9. The apparatus of claim 8 wherein the guide comprises an index of programs contained on the video cassette tape.

* * * * *